US009236150B2

(12) United States Patent
Ahlfeld et al.

(10) Patent No.: US 9,236,150 B2
(45) Date of Patent: Jan. 12, 2016

(54) STANDING WAVE NUCLEAR FISSION REACTOR AND METHODS

(75) Inventors: Charles E. Ahlfeld, La Jolla, CA (US); Thomas M. Burke, Prosser, WA (US); Tyler S. Ellis, Bellevue, WA (US); John Rogers Gilleland, Kirkland, WA (US); Jonatan Hejzlar, Cernosice (CZ); Pavel Hejzlar, Kirkland, WA (US); Roderick A. Hyde, Redmond, WA (US); David G. McAlees, Bellevue, WA (US); Jon D. McWhirter, Kirkland, WA (US); Ashok Odedra, Bellevue, WA (US); Robert C. Petroski, Seattle, WA (US); Nicholas W. Touran, Seattle, WA (US); Joshua C. Walter, Kirkland, WA (US); Kevan D. Weaver, Redmond, WA (US); Thomas Allan Weaver, San Mateo, CA (US); Charles Whitmer, North Bend, WA (US); Lowell L. Wood, Jr., Bellevue, WA (US); George B. Zimmerman, Lafayette, CA (US)

(73) Assignee: TerraPower, LLC, Bellevue, WA (US)

( * ) Notice: Subject to any disclaimer, the term of this patent is extended or adjusted under 35 U.S.C. 154(b) by 1218 days.

(21) Appl. No.: 12/925,985

(22) Filed: Nov. 2, 2010

(65) Prior Publication Data

US 2011/0110484 A1    May 12, 2011

Related U.S. Application Data

(60) Provisional application No. 61/280,370, filed on Nov. 2, 2009.

(51) Int. Cl.
*G01C 3/00*    (2006.01)
*G21C 1/02*    (2006.01)
(Continued)

(52) U.S. Cl.
CPC ............. *G21C 1/024* (2013.01); *G21C 1/026* (2013.01); *G21C 3/322* (2013.01); *G21C 15/06* (2013.01); *G21C 7/00* (2013.01); *G21C 19/205* (2013.01); *Y02E 30/34* (2013.01); *Y02E 30/38* (2013.01)

(58) Field of Classification Search
CPC ........ G21C 1/024; G21C 1/026; G21C 3/322; G21C 15/06; G21C 19/205; Y02E 30/38; Y02E 30/34
USPC .................................................. 376/264, 418
See application file for complete search history.

(56) References Cited

U.S. PATENT DOCUMENTS 2,961,393 A    11/1960  Monson
2,992,174 A    7/1961   Edlund et al.
(Continued)

FOREIGN PATENT DOCUMENTS

CA    2097412    * 12/1994
GB    1063696    3/1967
(Continued)

OTHER PUBLICATIONS

Ellis et al.; "Traveling-Wave Reactors: A Truly Sustainable and Full-Scale Resource for Global Energy Needs"; Proceedings of ICAPP '10; Jun. 13-17, 2010; pp. 1-13; Paper 10189.
(Continued)

*Primary Examiner* — Frank J McGue

(57) ABSTRACT

Disclosed embodiments include nuclear fission reactor cores, nuclear fission reactors, methods of operating a nuclear fission reactor, and methods of managing excess reactivity in a nuclear fission reactor.

52 Claims, 39 Drawing Sheets

(51) Int. Cl.
*G21C 3/322* (2006.01)
*G21C 15/06* (2006.01)
*G21C 19/00* (2006.01)
*G21C 7/00* (2006.01)
*G21C 19/20* (2006.01)

(56) References Cited

U.S. PATENT DOCUMENTS

| | | | |
|---|---|---|---|
| 3,096,263 A | 7/1963 | Kingston et al. | |
| 3,147,191 A | 9/1964 | Crowther | |
| 3,262,859 A | 7/1966 | Winsche | |
| 3,275,521 A | 9/1966 | Schluderberg et al. | |
| 3,321,377 A | 5/1967 | Schluderberg | |
| 3,335,061 A | 8/1967 | Winsche et al. | |
| 3,437,847 A | 4/1969 | Raspet | |
| 3,535,562 A | 10/1970 | Byrd | |
| 3,575,803 A | 4/1971 | Greebler | |
| 3,591,453 A | 7/1971 | Gratton | |
| 3,601,638 A | 8/1971 | Busse | |
| 3,607,631 A | 9/1971 | Hobson et al. | |
| 3,640,844 A * | 2/1972 | Shank et al. | 376/173 |
| 3,668,070 A | 6/1972 | Fiebelmann et al. | |
| 3,732,427 A | 5/1973 | Trudeau et al. | |
| 3,787,761 A * | 1/1974 | Grossman et al. | 324/226 |
| 3,802,995 A * | 4/1974 | Fritz et al. | 376/435 |
| 3,844,886 A * | 10/1974 | Crowther | 376/267 |
| 3,849,248 A * | 11/1974 | Channon et al. | 376/419 |
| 3,854,524 A | 12/1974 | Gregorie et al. | |
| 3,912,798 A * | 10/1975 | Rachor et al. | 264/0.5 |
| 3,957,575 A | 5/1976 | Fauth, Jr. et al. | |
| 4,040,902 A | 8/1977 | Mysels | |
| 4,056,437 A | 11/1977 | Giacometti et al. | |
| 4,072,559 A | 2/1978 | Neidl et al. | |
| 4,113,563 A * | 9/1978 | Tobin | 376/427 |
| 4,229,654 A * | 10/1980 | Arya et al. | 250/358.1 |
| 4,251,321 A * | 2/1981 | Crowther | 376/435 |
| 4,270,938 A | 6/1981 | Schmidt et al. | |
| 4,285,769 A * | 8/1981 | Specker et al. | 376/267 |
| T101,204 I4 | 11/1981 | Hampel | |
| 4,303,474 A | 12/1981 | Baxi | |
| 4,508,677 A | 4/1985 | Craig et al. | |
| 4,584,167 A | 4/1986 | Carelli | |
| 4,591,479 A | 5/1986 | Weitzberg | |
| 4,617,170 A | 10/1986 | Suchy | |
| 4,629,599 A * | 12/1986 | Crowther et al. | 376/212 |
| 4,636,352 A | 1/1987 | Boyle | |
| 4,649,020 A | 3/1987 | Dehon et al. | |
| 4,663,110 A * | 5/1987 | Cheng | 376/146 |
| 4,668,468 A * | 5/1987 | Santucci | 376/419 |
| 4,678,619 A * | 7/1987 | Radkowsky | 376/173 |
| 4,687,621 A * | 8/1987 | Ferrari | 376/209 |
| 4,749,544 A | 6/1988 | Crowther et al. | |
| 4,762,672 A * | 8/1988 | Kurihara et al. | 376/333 |
| 4,764,339 A | 8/1988 | Lake et al. | |
| 4,827,139 A | 5/1989 | Wells et al. | |
| 4,851,181 A | 7/1989 | Takeda et al. | |
| 4,851,183 A | 7/1989 | Hampel | |
| 4,859,400 A * | 8/1989 | Curzon | 376/172 |
| 4,879,086 A * | 11/1989 | Luce et al. | 376/173 |
| 5,019,322 A | 5/1991 | von Charzewski et al. | |
| 5,082,617 A | 1/1992 | Walter et al. | |
| 5,089,210 A * | 2/1992 | Reese et al. | 376/212 |
| 5,116,567 A | 5/1992 | Fennern | |
| 5,149,491 A | 9/1992 | Congdon et al. | |
| 5,182,077 A | 1/1993 | Feinroth | |
| 5,202,084 A | 4/1993 | Fennern et al. | |
| 5,223,210 A | 6/1993 | Hunsbedt et al. | |
| 5,241,573 A | 8/1993 | Thacker | |
| 5,264,056 A | 11/1993 | Lapides | |
| 5,307,387 A | 4/1994 | Nakajima et al. | |
| 5,309,493 A | 5/1994 | Kamimura et al. | |
| 5,353,321 A | 10/1994 | Rybnikov | |
| 5,408,510 A | 4/1995 | Ball et al. | |
| 5,446,773 A | 8/1995 | Wakabayashi | |
| 5,493,592 A | 2/1996 | Garzarolli et al. | |
| 5,677,938 A * | 10/1997 | Gassmann | 376/237 |
| 5,684,848 A | 11/1997 | Gou et al. | |
| 5,872,826 A | 2/1999 | Fujieda et al. | |
| 6,026,136 A | 2/2000 | Radkowsky | |
| 6,120,706 A | 9/2000 | Lessing et al. | |
| 6,233,298 B1 | 5/2001 | Bowman | |
| 6,504,889 B1 | 1/2003 | Narita et al. | |
| 6,512,805 B1 | 1/2003 | Takeda et al. | |
| 6,748,348 B1 | 6/2004 | Russell, II | |
| 6,768,781 B1 | 7/2004 | Moriarty | |
| 6,862,329 B1 | 3/2005 | Kropaczek et al. | |
| 6,944,255 B2 | 9/2005 | Hattori et al. | |
| 7,224,761 B2 | 5/2007 | Popa | |
| 2003/0174802 A1 | 9/2003 | Hare | |
| 2004/0047445 A1 | 3/2004 | Delafoy et al. | |
| 2004/0182088 A1 | 9/2004 | Ghoshal et al. | |
| 2006/0056572 A1 | 3/2006 | Lecomte | |
| 2006/0133972 A1 | 6/2006 | Guetlhuber et al. | |
| 2006/0171498 A1 | 8/2006 | D'Auvergne | |
| 2006/0227924 A1 | 10/2006 | Hallstadius et al. | |
| 2007/0092053 A1 | 4/2007 | Sato | |
| 2008/0069289 A1 | 3/2008 | Peterson | |
| 2008/0123795 A1 * | 5/2008 | Hyde et al. | 376/244 |
| 2008/0123796 A1 * | 5/2008 | Hyde et al. | 376/261 |
| 2008/0123797 A1 * | 5/2008 | Hyde et al. | 376/261 |
| 2008/0144762 A1 * | 6/2008 | Holden et al. | 376/416 |
| 2008/0232533 A1 | 9/2008 | Blanovsky | |
| 2008/0232535 A1 * | 9/2008 | Ahlfeld et al. | 376/260 |
| 2008/0240333 A1 * | 10/2008 | Ahlfeld et al. | 376/409 |
| 2009/0080587 A1 * | 3/2009 | Ahlfeld et al. | 376/261 |
| 2009/0080588 A1 * | 3/2009 | Ahlfeld et al. | 376/261 |
| 2009/0080592 A1 | 3/2009 | Arsenlis et al. | |
| 2009/0175402 A1 * | 7/2009 | Hyde et al. | 376/210 |
| 2009/0225920 A1 * | 9/2009 | Ahlfeld et al. | 376/158 |
| 2009/0232268 A1 * | 9/2009 | Ahlfeld et al. | 376/287 |
| 2009/0252273 A1 * | 10/2009 | Gilleland et al. | 376/261 |
| 2009/0252283 A1 | 10/2009 | Ahlfeld et al. | |
| 2009/0323881 A1 * | 12/2009 | Dauvergne | 376/173 |
| 2010/0067644 A1 * | 3/2010 | D'Auvergne | 376/294 |
| 2010/0208861 A1 | 8/2010 | Hyde et al. | |
| 2010/0254501 A1 | 10/2010 | Ahlfeld et al. | |
| 2010/0254502 A1 | 10/2010 | Ahlfeld et al. | |
| 2010/0266085 A1 | 10/2010 | Ahlfeld et al. | |
| 2010/0266088 A1 | 10/2010 | Ahlfeld et al. | |

FOREIGN PATENT DOCUMENTS

| | | |
|---|---|---|
| JP | 53-112391 | 9/1978 |
| JP | 60-239697 | 5/1984 |
| JP | 60-146181 | 8/1985 |
| JP | 63-045557 | 9/1988 |
| JP | 03-029893 | 2/1991 |
| JP | 04-252995 | 9/1992 |
| JP | 04-299286 | 10/1992 |
| JP | 04-299287 | 10/1992 |
| JP | 05-180971 | 7/1993 |
| JP | 06-235791 | 8/1994 |
| JP | 08-240686 | 9/1996 |
| JP | 2000-162355 | 6/2000 |
| JP | 2002-062391 | 2/2002 |
| JP | 2003-021692 | 1/2003 |

OTHER PUBLICATIONS

PCT International Search Report; International App. No. PCT/US11/01856; Feb. 28, 2012; pp. 1-2.

PCT International Search Report; International App. No. PCT/US11/01857; Mar. 1, 2012; pp. 1-2.

PCT International Search Report; International App. No. PCT/US11/01855; Mar. 20, 2012; pp. 1-2.

International Search Report; International App. No. PCT/US2010/002892; Aug. 12, 2011; pp. 1-2.

Akhiezer, A. I.; Khizhnyak, N. A.; Shulga, N. F.; Pilipenko, V. V.; and Davydov, L. N.; "Slow Nuclear Burning"; Problems of Atomic Science and Technology; 2001; pp. 272-275; vol. 6.

Atefi, B.; Driscoll, M. J.; and Lanning, D. D.; "An Evaluation of the Breed/Burn Fast Reactor Concept"; Massachusetts Institute of Technology, Department of Nuclear Engineering; Dec. 1979; pp. 1-295.

(56) References Cited

OTHER PUBLICATIONS

Chen et al.; "Transverse buckling effects on solitary burn-up waves"; Annals of Nuclear Energy; bearing dates of Dec. 24, 2004, Jan. 5, 2005, and Apr. 29, 2005; pp. 1377-1390; vol. 32; Elsevier Ltd.
European Search Report; App. No. 09742958.3; Mar. 29, 2011; p. 1-4.
European Search Report; App. No. 07872643; Jun. 6, 2011; pp. 1-13.
Feinberg, S. M.; "Discussion Comment"; Rec. of Proc. Session B-10 of the ICPUAE; Sep. 10, 1958; p. 447-449; No. 2, vol. 9; Geneva, Switzerland.
Feoktistov, L. P.; "An Analysis of a Concept of a Physically Safe Reactor"; Preprint IAE-4605/4; Moscow: IAE; 1988; pp. 1-9; in Russian.
Feoktistov, L. P.; "Neutron-Fissioning Wave"; Dokl. Akad. Nauk SSSR; 1989; pp. 864-867; in Russian.
Fomin, S. P.; Mel'Nik, Yu. P.; Pilipenko, V. V.; and Shul'Ga, N. F.; "Study of Self-Organizing Regime of Nuclear Burning Wave in Fast Reactor"; Problems of Atomic Science and Technology; 2005; pp. 106-113, No. 6.
Greenspan, E.; Hejzlar, P.; Sekimoto, H.; Toshinsky, G.; and Wade, D.C.; "New Fuel Cycle and Fuel Management Options in Heavy Liquid Metal Cooled Reactors"; Nuclear Technology; Aug. 15, 2005; pp. 177-191; vol. 151.
Hyde, Roderick; Ishikawa, Muriel; Myhrvold, Nathan; Nuckolls, John; Wood, Jr., Lowell; "Nuclear Fission Power for $21^{st}$ Century Needs: Enabling Technologies for Large-Scale, Low-Risk, Affordable Nuclear Electricity [Abstract]"; p. 1.
International Search Report; International App. No. PCT/US2010/002925; Jan. 31, 2011; pp. 1-2.
International Search Report; International App. No. PCT/US2009/04512; Dec. 7, 2009; pp. 1-2.
International Search Report; International App. No. PCT/US2009/00765; Oct. 13, 2009; pp. 1-2.
International Search Report; International App. No. PCT/US2009/00764; Oct. 13, 2009; pp. 1-2.
International Search Report; International App. No. PCT/US2009/00763; Oct. 5, 2009; pp. 1-2.
International Search Report; International App. No. PCT/US2007/024445; Aug. 26, 2008; pp. 1-2.
International Search Report; International App. No. PCT/US2007/024392; Oct. 7, 2008; pp. 1-4.
International Search Report; International App. No. PCT/US2007/024375; Oct. 7, 2008; pp. 1-4.
Ohoka, Y.; and Sekimoto, H.; "Application of CANDLE Burnup to Block-Type High Temperature Gas Cooled Reactor"; Nuclear Engineering and Design; 2004; pp. 15-23; vol. 229; Elsevier B. V.
Ohoka, Yasunori; Watanabe, Takashi; and Sekimoto, Hiroshi; "Simulation Study on Candle Burnup Applied to Block-Type High Temperature Gas Cooled Reactor"; Progress in Nuclear Energy; 2005; pp. 292-299; vol. 47, No. 1-4; Elsevier, Ltd.; Great Britain.
Ryu, Kouichi and Sekimoto, Hiroshi; "Basic Study of Concentrically Zoned Fast Reactor Using Natural Uranium Highly Efficiently without Fuel Reprocessing"; Annals of Nuclear Energy; bearing dates of Mar. 26, 1999 and May 4, 1999; pp. 9398; vol. 27; Elsevier Science Ltd.
Sekimoto, Hiroshi; "Application of CANDLE Burnup Strategy for Future Nuclear Energy Utilization"; Progress in Nuclear Energy; 2005; pp. 91-98; vol. 47; No. 1-4; Elsevier Ltd.; Great Britain.
Sekimoto, Hiroshi; "Fuel-Cycle of CANDLE Burnup with Depleted Uranium"; Proc. of ICAPP 2005; May 15-19, 2005; Seoul, Korea.
Sekimoto, Hiroshi; "Fuel-Cycle of CANDLE Burnup with Depleted Uranium"; Proc. of ICAPP 2006; Jun. 4-8, 2006, Reno, Nevada; pp. 1908-1914; American Nuclear Society; LaGrange Park, IL.
Sekimoto, Hiroshi; "Summary of the MIT-Tokyo Tech Symposium on Innovative Nuclear Energy Systems"; Nov. 2-4, 2005; pp. 1-17; Cambridge, MA.
Sekimoto, Hiroshi and Ryu, Kouichi; "A New Reactor Burnup Concept 'Candle'"; Proc. of PHYSOR2000; May 7-11, 2000; pp. 1-9; Pittsburgh, PA.

Sekimoto, Hiroshi; Ryu, Kouichi; and Yoshimura, Yoshikane; "CANDLE: The New Burnup Strategy"; Nuclear Science and Engineering; 2001; pp. 306-317; vol. 139.
Sekimoto, Hiroshi and Tanaka, Kohtaro; "Candle Burnup for Different Cores"; Proc. of PHYSOR 2002: International Conference on the New Frontiers of Nuclear Technology: Reactor Physics, Safety and High-Performance Computing; Oct. 7-10, 2002; pp. 1-12; Seoul, Korea.
Sekimoto, Hiroshi; Toshinsky, V.; and Ryu, K.; "Natural Uranium Utilization without Enrichment and Reprocessing"; Proc. of GLOBAL 2001; Sep. 9-13, 2001; pp. 1-3; Paris, France.
Sekimoto, Hiroshi, Miyashita, Seiichi; "Startup of 'Candle' burnup in fast reactor from enriched uranium core"; Energy Conversion and Management; May 22, 2006; p. 2772-2780; vol. 47; Elsevier Ltd.
Soentono, Soedyartomo; "Nuclear Power Development in Indonesia"; Proc. of Energy Future and the Nuclear Fuel Cycle in the Asia/Pacific Region, 19th Annual Conference Industrial Liaison Program; pp. 51-61; Mar. 12, 1997.
Teller, Edward. "Nuclear Energy for the Third Millenium"; International Conference on Environment and Nuclear Energy; bearing a date of Oct. 27-29, 1997; 1-14; Livermore, California.
Teller, Edward; Ishikawa, Muriel; Wood, Lowell; "Completely Automated Nuclear Reactors for Long-Term Operation"; Frontiers in Physics Symposium, Joint American Physical Society and the America Association of Physics Teachers Texas meeting Oct. 26-28, 1995; Jan. 1996; 1-15; Lubbock, Texas.
Teller, Edward; Ishikawa, Muriel; Wood, Lowell; Hyde, Roderick; Nuckolls, John; "Completely Automated Nuclear Reactors for Long-Term Operation II: Toward A Concept-Level Point-Design Of A High-Temperature, Gas-Cooled Central Power Station"; 1996 International Conference on Emerging Nuclear Energy Systems; bearing dates of Jun. 20, 1996 and Jun. 24-28, 1996; 1-44; Lawrence Livermore National Laboratory; Livermore, California.
Teller, Edward; Ishikawa, Muriel; Wood, Jr., Lowell; Hyde, Roderick; Nuckolls, John; "Completely Automated Nuclear Power Reactors for Long-Term Operation: III. Enabling Technology for Large-Scale, Low-Risk, Affordable Nuclear Electricity"; 1-57; University of California Lawrence Livermore National Laboratory; Livermore, California.
Teller, Edward; Wood, Lowell; Nuckolls, John; Ishikawa, Muriel; Hyde, Roderick; "Problem-Free Nuclear Power and Global Change"; $22^{nd}$ International Symposium on Planetary Emergencies; bearing dates of Aug. 15, 1997 and Aug. 20-23, 1997; 1-10; Lawrence Livermore National Laboratory; Livermore, California.
Toshinsky, Georgy I.; "LMFBR Operation in the Nuclear Cycle Without Fuel Reprocessing"; Proceedings of the International Topical Meeting on Advanced Reactors Safety (ARS '97); Jun. 1-5, 1997; pp. 39-44; vol. I; Orlando, FL.
Toshinsky, Vladimir G.; Sekimoto, Hiroshi; and Toshinsky, Georgy I.; "Multiobjective Fuel Management Optimization for Self-Fuel-Providing LMFBR Using Genetic Algorithms"; Annals of Nuclear Energy; 1999; pp. 783-802; vol. 26; Elsevier Science Ltd.
Wood, Lowell; Hyde, Roderick; Ishikawa, Muriel; "Global Warming and Nuclear Power"; $9^{th}$ Summer Workshop, Innovative Energy Systems and CO2 Stabilization Jul. 14-24, 1998; Jul. 10, 1998; 1-21; Aspen, Colorado.
Wood, Lowell; Hyde, Roderick; Ishikawa, Muriel; "Novel Approaches to Nuclear Fission Power Generation: A Practical, Manifestly Safe Point-Design for World-Wide Civil Use in the $21^{st}$ Century"; LLNL P&AT/CGSR ad hoc session; bearing a date of Apr. 25, 2001; 1-15.
Van Dam, Hugo; "The Self-Stabilizing Criticality Wave Reactor"; Proc. of the Tenth International Conference on Emerging Nuclear Energy Systems (ICENES 2000); 2000; pp. 009.1-009.10; Petten, Netherlands.
Yarsky, P.; Driscoll, M. J.; and Hejzlar, P.; "Integrated Design of a Breed and Burn Gas-Cooled Fast Reactor Core"; The MIT Center for Advanced Nuclear Energy Systems (CANES); Document No. MIT-ANP-TR-107; Sep. 2005; pp. 1-253.

* cited by examiner

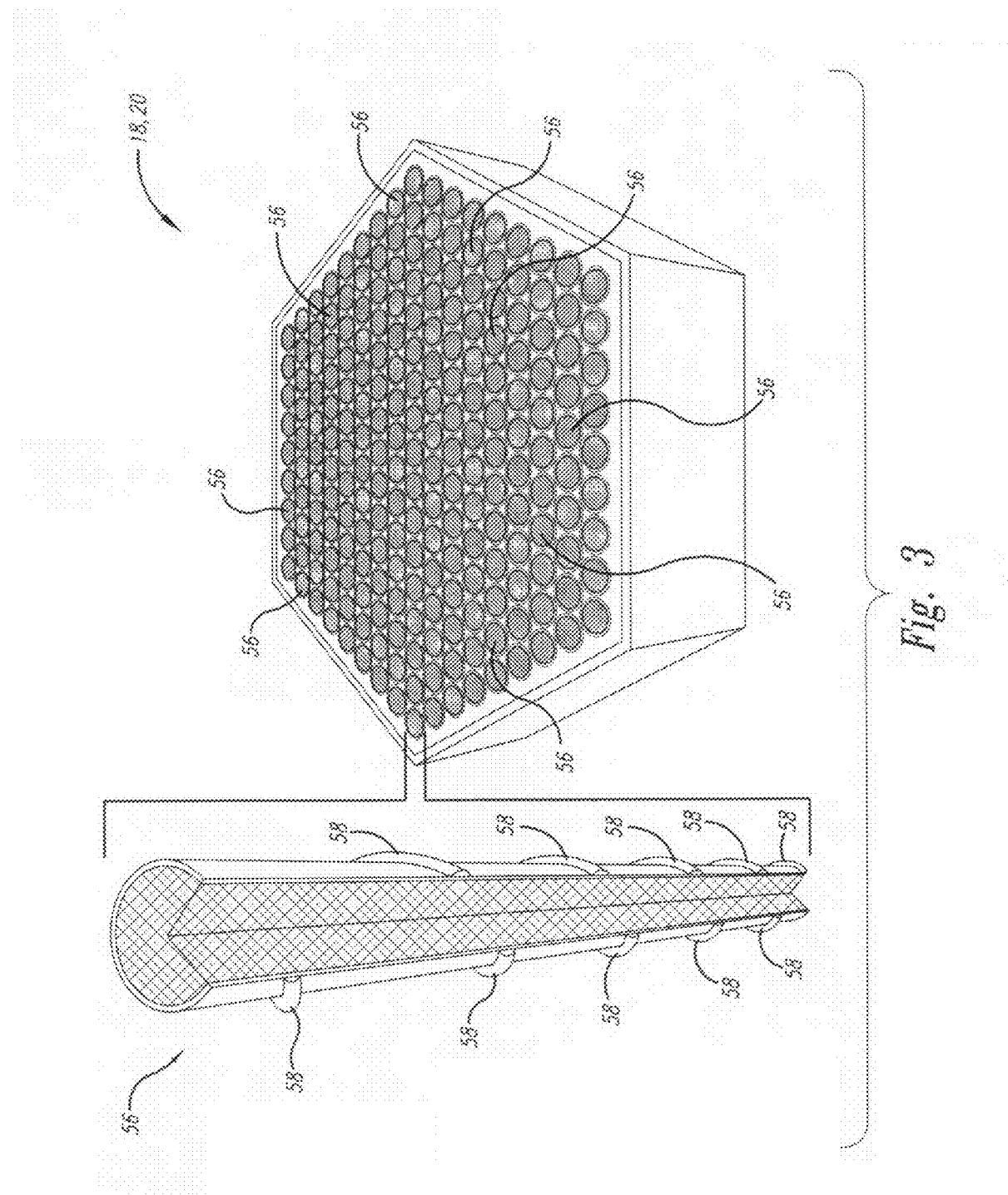

STANDING WAVE NUCLEAR FISSION REACTOR AND METHODS

CROSS-REFERENCE TO RELATED APPLICATIONS

The present application is related to and claims the benefit of the earliest available effective filing date from the following listed application (the "Related Application") (e.g., claims benefits under 35 USC §119(e) for provisional patent applications, for any and all parent, grandparent, great-grandparent, etc. applications of the Related Application).

RELATED APPLICATIONS

For purposes of the USPTO extra-statutory requirements, the present application claims benefit of priority of U.S. Provisional Patent Application No. 61/280,370, entitled TRAVELING WAVE NUCLEAR FISSION REACTOR FUEL SYSTEM AND METHOD, naming Charles E. Ahlfeld, Thomas M. Burke, Tyler S. Ellis, John Rogers Gilleland, Jonatan Hejzlar, Pavel Hejzlar, Roderick A. Hyde, David G. McAlees, Jon D. McWhirter, Ashok Odedra, Robert C. Petroski, Nicholas W. Touran, Joshua C. Walter, Kevan D. Weaver, Thomas Allan Weaver, Charles Whitmer, Lowell L. Wood, Jr., and George B. Zimmerman as inventors, filed Nov. 2, 2009, which was filed within the twelve months preceding the filing date of the present application or is an application of which a currently co-pending application is entitled to the benefit of the filing date.

The United States Patent Office (USPTO) has published a notice to the effect that the USPTO's computer programs require that patent applicants reference both a serial number and indicate whether an application is a continuation or continuation-in-part. Stephen G. Kunin, *Benefit of Prior-Filed Application*, USPTO Official Gazette Mar. 18, 2003, available at http://www.uspto.gov/web/offices/com/sol/og/2003/week11/patbene.htm. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant is designating the present application as a continuation-in-part of its parent applications as set forth above, but expressly points out that such designations are not to be construed in any way as any type of commentary and/or admission as to whether or not the present application contains any new matter in addition to the matter of its parent application(s).

All subject matter of the Related Application and of any and all parent, grandparent, great-grandparent, etc. applications of the Related Application is incorporated herein by reference to the extent such subject matter is not inconsistent herewith.

BACKGROUND

The present patent application relates to nuclear fission reactors and methods.

SUMMARY

Disclosed embodiments include nuclear fission reactor cores, nuclear fission reactors, methods of operating a nuclear fission reactor, and methods of managing excess reactivity in a nuclear fission reactor.

The foregoing is a summary and thus may contain simplifications, generalizations, inclusions, and/or omissions of detail; consequently, those skilled in the art will appreciate that the summary is illustrative only and is NOT intended to be in any way limiting. In addition to any illustrative aspects, embodiments, and features described above, further aspects, embodiments, and features will become apparent by reference to the drawings and the following detailed description. Other aspects, features, and advantages of the devices and/or processes and/or other subject matter described herein will become apparent in the teachings set forth herein.

BRIEF DESCRIPTION OF THE FIGURES

FIG. 3 is partial-cutaway perspective view in schematic form of an illustrative nuclear fuel assembly.

DETAILED DESCRIPTION

Introduction

Figure 1A:
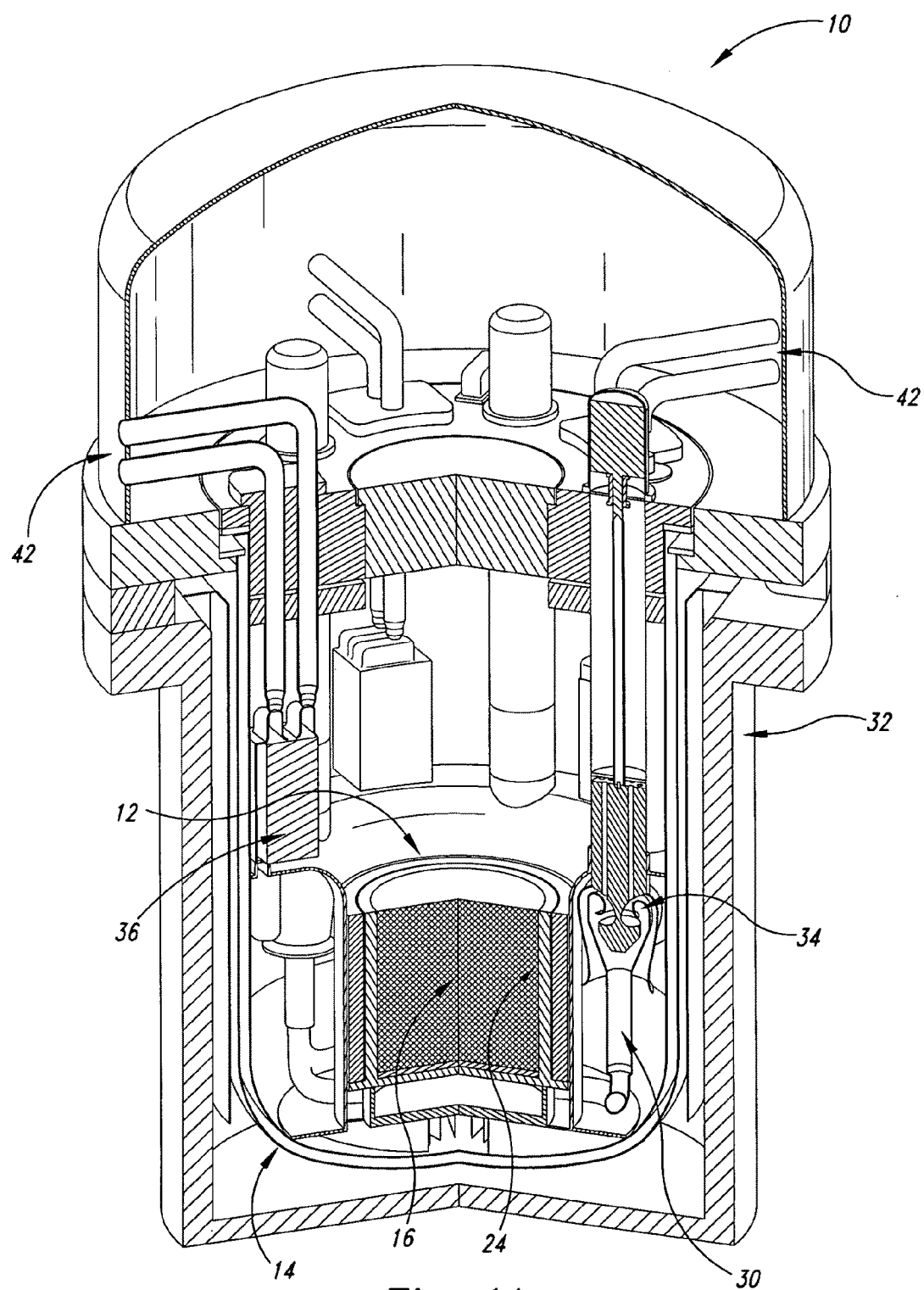
FIGS. 1A-1C are partial-cutaway perspective views of an illustrative nuclear fission reactor.
Figure 1B:
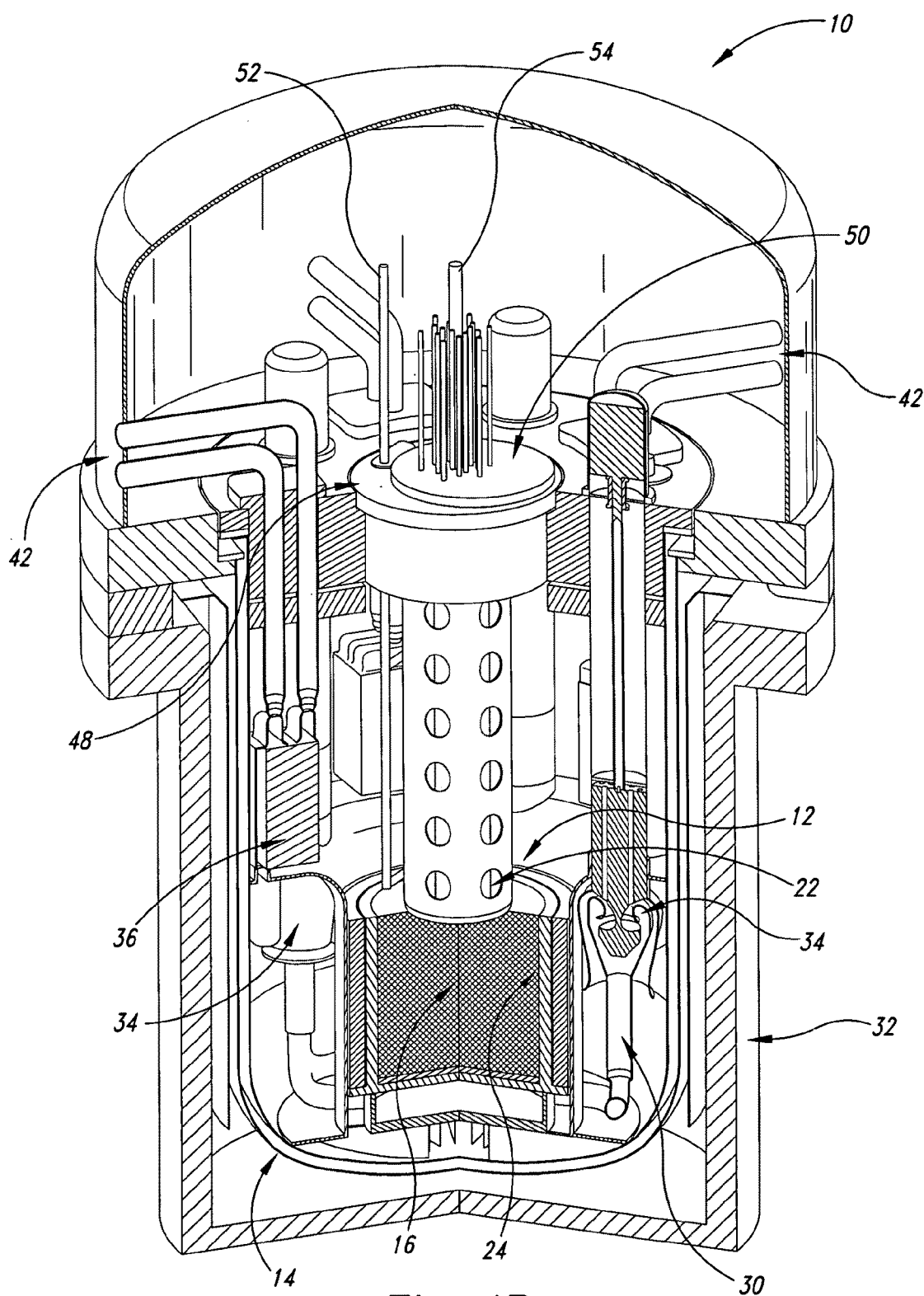
Figure 1C:
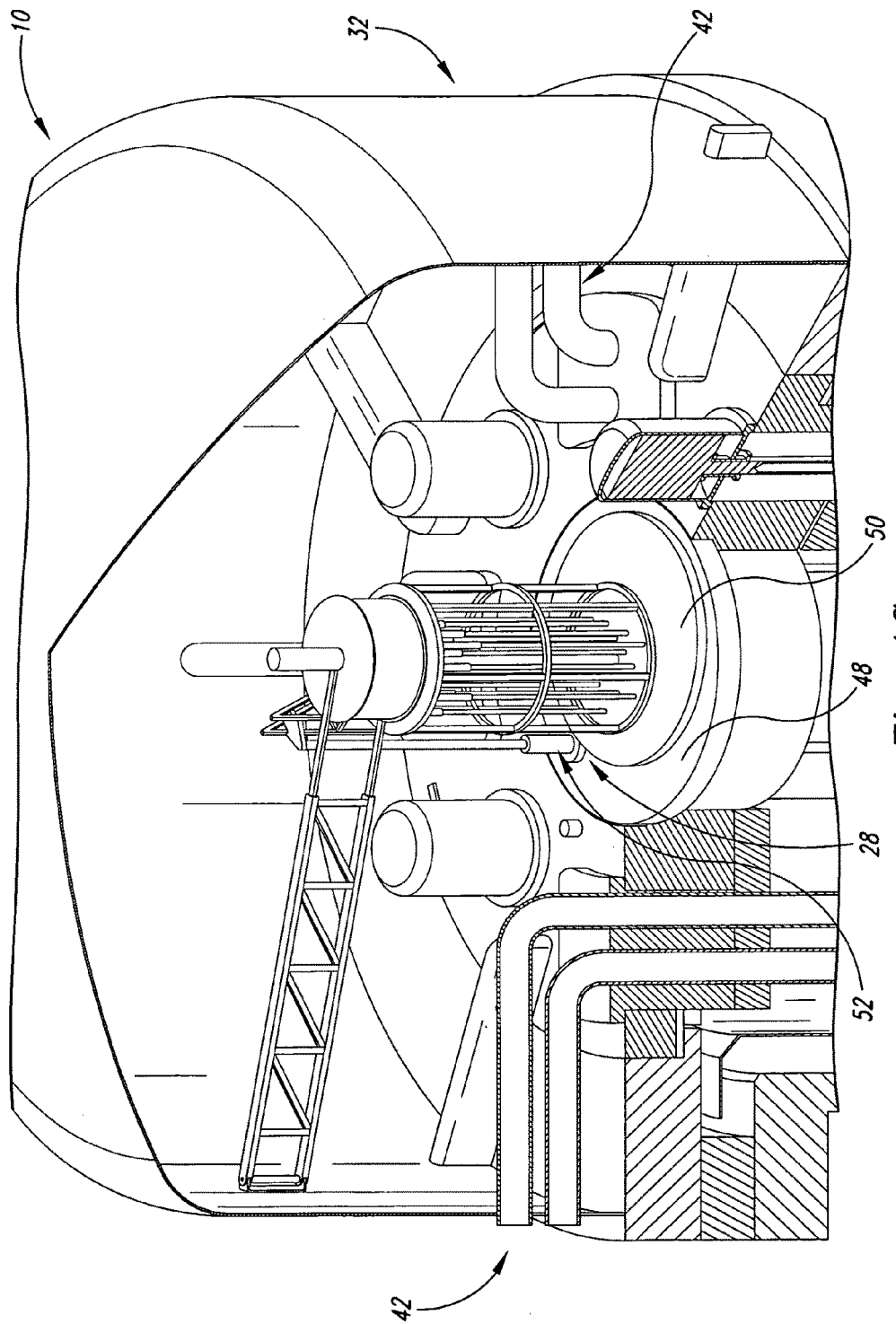

In the following detailed description, reference is made to the accompanying drawings, which form a part hereof. In the drawings, the use of similar or the same symbols in different drawings typically indicates similar or identical items, unless context dictates otherwise.

The illustrative embodiments described in the detailed description, drawings, and claims are not meant to be limiting. Other embodiments may be utilized, and other changes may be made, without departing from the spirit or scope of the subject matter presented here.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The present application uses formal outline headings for clarity of presentation. However, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, the use of the formal outline headings is not intended to be in any way limiting.

Overview

Referring now to FIGS. 1A-1C and FIG. 2 and given by way of non-limiting overview, an illustrative nuclear fission reactor 10 will be described by way of illustration and not of limitation. As will be discussed below in detail, embodiments of the nuclear fission reactor 10 are breed-and-burn fast reactors (also referred to as traveling wave reactors, or TWRs) in which a standing wave of breeding-and-fissioning (also referred to as a breed-burn wave) via movement (also referred to as shuffling) of nuclear fuel assemblies.

Figure 2:
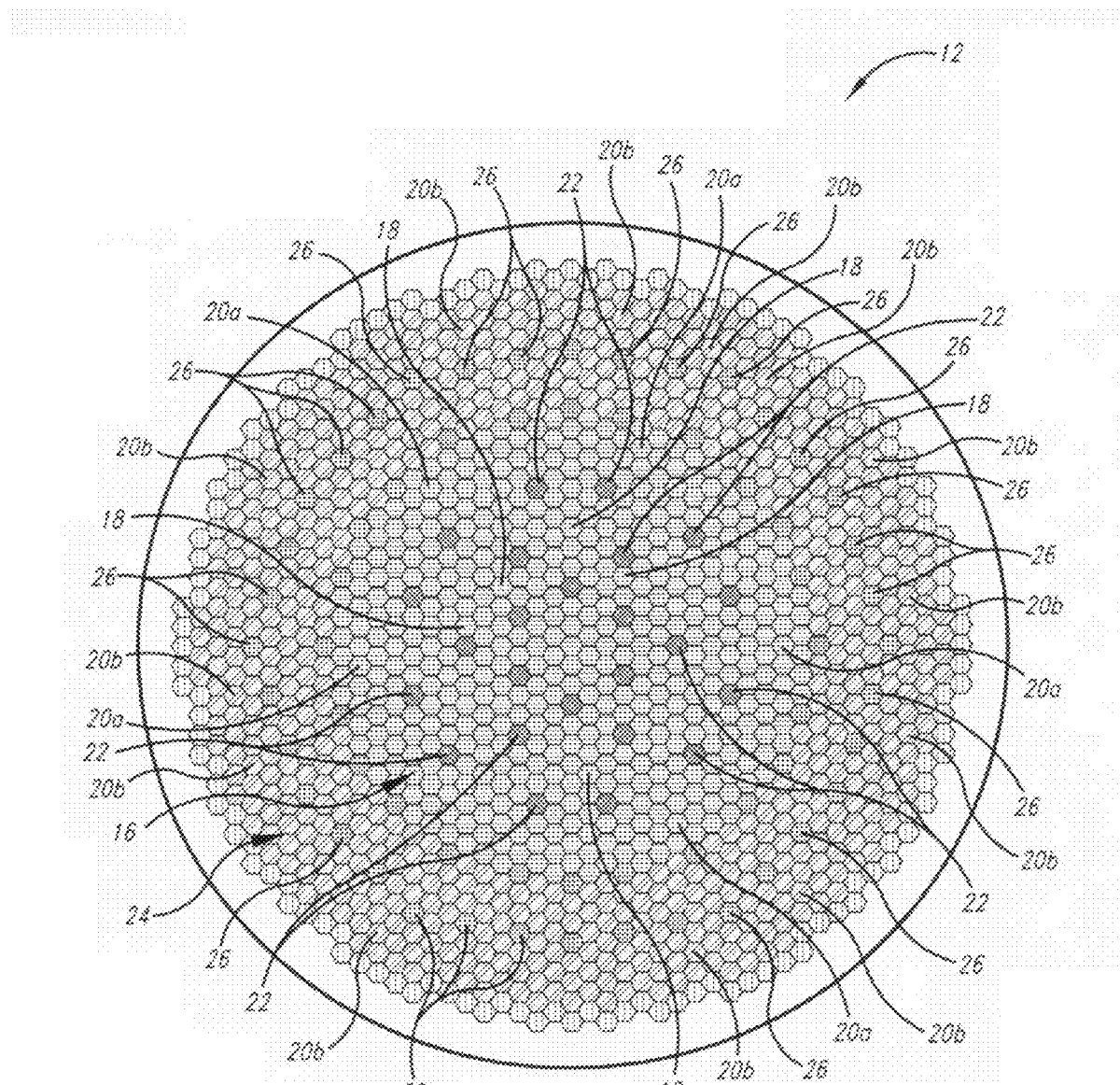
FIG. 2 is a top plan view in schematic form of an illustrative nuclear fission reactor core.

Still by way of overview, a nuclear fission reactor core 12 is disposed in a reactor vessel 14. A central core region 16 (FIG. 2) of the nuclear fission reactor core 12 includes fissile nuclear fuel assemblies 18 (FIG. 2). The central core region 16 also includes fertile nuclear fuel assemblies 20a (FIG. 2). The central core region 16 also includes movable reactivity control assemblies 22 (FIG. 2).

A peripheral core region 24 (FIG. 2) of the nuclear fission reactor core 12 includes fertile nuclear fuel assemblies 20b (FIG. 2). It will be appreciated that the fertile nuclear fuel assemblies 20a and 20b may be made of the same or similar construction (as indicated by use of similar reference numbers). As will be explained further below, the fertile nuclear fuel assemblies 20a reside in a neutron flux environment in the central core region 16 that is different from the neutron flux environment in the peripheral core region 24 (in which the fertile nuclear fuel assemblies 20b reside). As a result, over core life the fertile nuclear fuel assemblies 20a may undergo breeding and may experience burnup at rates that are different from rates undergone and experienced by the fertile nuclear fuel assemblies 20b. Therefore, the similar (but not the same) reference numbers 20a and 20b are used to help keep track of the fertile nuclear fuel assemblies 20a and 20b during discussions herein of various phases of core life. The peripheral core region 24 also includes neutron absorber assemblies 26.

An in-vessel handling system 28 is configured to shuffle ones of the fissile nuclear fuel assemblies 18 and ones of the fertile nuclear fuel assemblies 20a and 20b. The nuclear fission reactor 10 also includes a reactor coolant system 30.

Continuing by way of non-limiting overview, according to some aspects methods are provided for operating a nuclear fission reactor. Given by way of non-limiting example, in some embodiments fissile nuclear fuel material in a plurality of fissile nuclear fuel assemblies is fissioned in a central core region of a nuclear fission reactor core of a nuclear fission reactor. Fissile material is bred in ones of a plurality of fertile nuclear fuel assemblies in the central core region of the nuclear fission reactor core, and selected ones of the plurality of fissile nuclear fuel assemblies and selected ones and selected others of the plurality of fertile nuclear fuel assemblies are shuffled in a manner that establishes a standing wave of breeding fissile nuclear fuel material and fissioning fissile nuclear fuel material.

Continuing by way of non-limiting overview, according to some aspects methods are provided for managing excess reactivity in a nuclear fission reactor. Given by way of non-limiting example, in some embodiments criticality with a positive quantity of reactivity is achieved in a central core region of a reactor core of a nuclear fission reactor. The quantity of reactivity is increased until a predetermined burnup level is achieved in selected ones of fuel assemblies in the reactor core, and the increase in reactivity is compensated for.

Details will be set forth below by way of non-limiting examples.

Illustrative Nuclear Fission Reactors

In the discussion set forth below, details regarding extra-core components of the nuclear fission reactor 10 will be set forth first by way of non-limiting examples. Details regarding extra-core components of the nuclear fission reactor 10 will be set forth next by way of non-limiting examples. This ordering of discussion details will facilitate an understanding of establishment of a standing wave of breeding and fissioning in the nuclear fission reactor core 10.

Extra-Core Components

Still referring to FIGS. 1A-1C and FIG. 2, embodiments of the nuclear fission reactor 10 may be sized for any application as desired. For example, various embodiments of the nuclear fission reactor 10 may be used in low power (around 300 $MW_e$—around 500 $MW_e$) applications, medium power (around 500 $MW_e$—around 1000 $MW_e$) applications, and large power (around 1000 $MW_e$ and above) applications as desired.

Embodiments of the nuclear fission reactor 10 are based on elements of liquid metal-cooled, fast reactor technology. For example, in various embodiments the reactor coolant system 30 includes a pool of liquid sodium disposed in the reactor vessel 14. In such cases, the nuclear fission reactor core 12 is submerged in the pool of sodium coolant in the reactor vessel 14. The reactor vessel 14 is surrounded by a containment vessel 32 that helps prevent loss of sodium coolant in the unlikely case of a leak from the reactor vessel 14.

In various embodiments the reactor coolant system 30 also includes reactor coolant pumps 34. The reactor coolant pumps 34 may be any suitable pump as desired, such as for example electromechanical pumps or electromagnetic pumps.

In various embodiments the reactor coolant system 30 also includes heat exchangers 36. The heat exchangers 36 are disposed in the pool of primary liquid sodium. The heat exchangers 36 have non-radioactive intermediate sodium coolant on the other side of the heat exchangers 36. To that end, the heat exchangers 36 may be considered intermediate heat exchangers. Steam generators (not shown for clarity in FIGS. 1A-1C and 2) are in thermal communication with the heat exchangers 36. It will be appreciated that any number of reactor coolant pumps 34, heat exchangers 36, and steam generators may be used as desired.

The reactor coolant pumps 34 circulate primary sodium coolant through the nuclear fission reactor core 12. The pumped primary sodium coolant exits the nuclear fission reactor core 12 at a top of the nuclear fission reactor core 12 and passes through one side of the heat exchangers 36. Heated intermediate sodium coolant is circulated via intermediate sodium loops 42 to the steam generators (not shown) that, in turn, generate steam to drive turbines (not shown) and electrical generators (not shown).

During periods of reactor shut down, in some embodiments plant electrical loads are powered by the electrical grid and decay heat removal is provided by pony motors (not shown for clarity) on the reactor coolant pumps 34 that deliver reduced reactor coolant flow through heat transport systems.

Figure 5A:
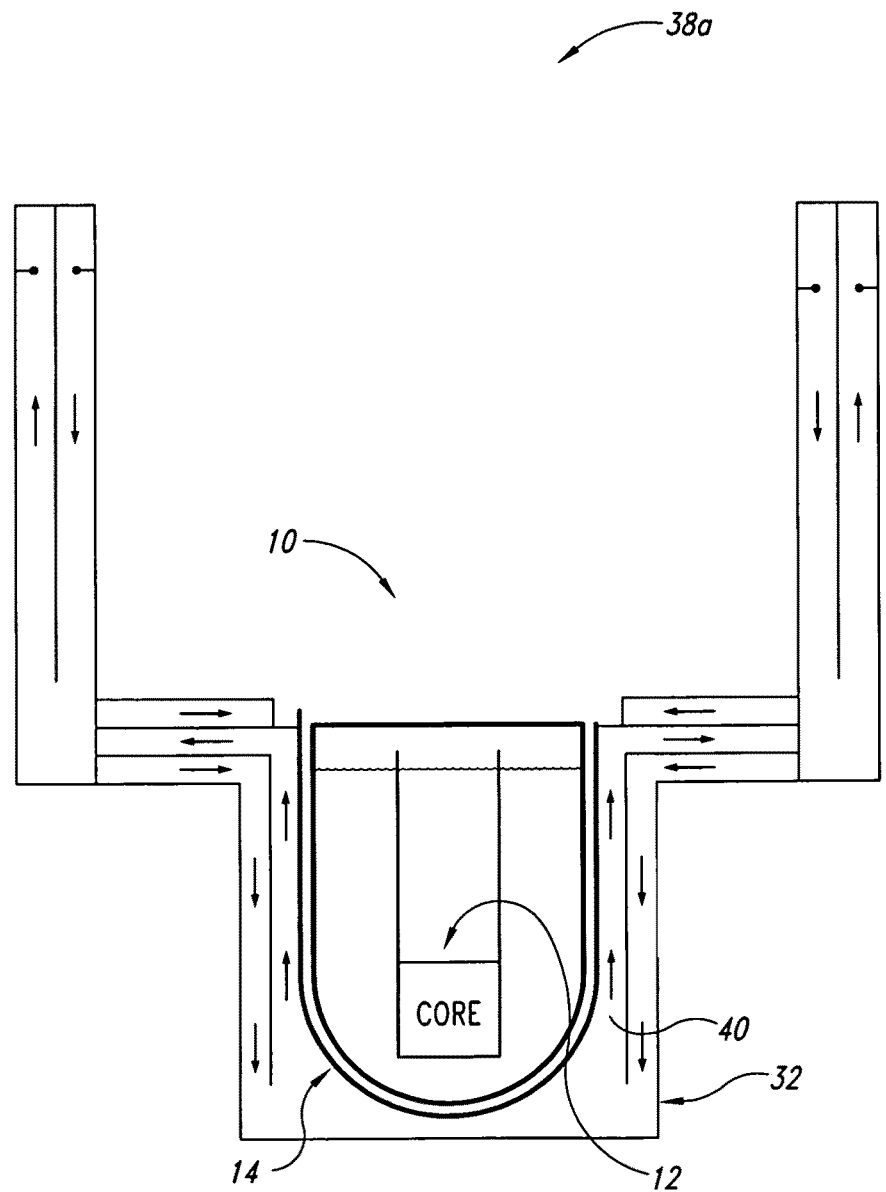
FIGS. 5A and 5B are side plan views in schematic form of illustrative decay heat removal systems.
Figure 5B:
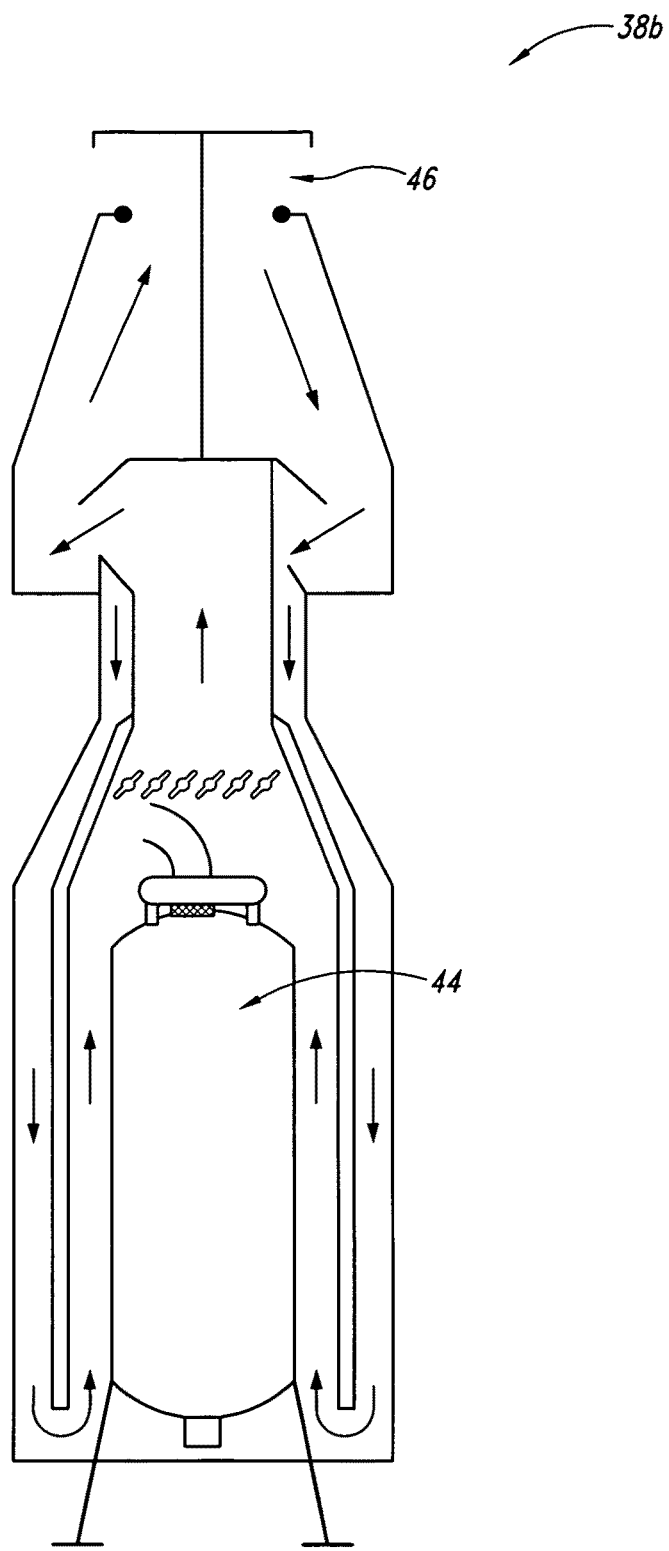

Referring additionally to FIGS. 5A and 5B, in various embodiments the nuclear fission reactor 10 includes a decay heat removal system 38. In the event that electrical power is not available from the electric grid, decay heat is removed using the decay heat removal system 38. In various embodiments, the decay heat removal system 38 may include either one or both of two dedicated safety class decay heat removal systems 38a (FIG. 5A) and 38b (FIG. 5B) which operate entirely by natural circulation with no need for electrical power. In the safety class decay heat removal system 38a (FIG. 5A), heat from the nuclear fission reactor core 12 first is transferred by naturally circulated sodium to the reactor vessel 14, then is radiated across an argon-filled gap 40 between the reactor vessel 14 and the containment vessel 32, and finally is removed by naturally circulating ambient air that flows along the wall of the containment vessel 32.

In the safety class decay heat removal system 38b (FIG. 5B), the heat exchangers 36 and the intermediate sodium loops 42 (FIGS. 1A-1C) transfer heat by natural circulation of sodium to steam generators 44 where the heat is dissipated through shell walls of the steam generator 44 using ambient temperature air drawn in through protected air intakes 46.

Referring back to FIGS. 1A-1C and 2, the in-vessel handling system 28 is configured to shuffle ones of the fissile nuclear fuel assemblies 18 and ones of the fertile nuclear fuel assemblies 20a and 20b. In some stages of core life (as will be discussed below), it may be desired to shuffle ones of the fissile nuclear fuel assemblies 18 and ones of the fertile nuclear fuel assemblies 20a and 20b between the central core region 16 and the peripheral core region 24. Thus, the in-vessel handling system 28 may also be configured to shuffle ones of the fissile nuclear fuel assemblies 18 and ones of the fertile nuclear fuel assemblies 20a and 20b between the central core region 16 and the peripheral core region 24.

It will be appreciated that the in-vessel handling system 28 permits movement of the selected fissile nuclear fuel assemblies 18 and fertile nuclear fuel assemblies 20a and 20b without removing the moved fissile nuclear fuel assemblies 18 and fertile nuclear fuel assemblies 20a and 20b from the nuclear fission reactor 10.

In various embodiments, the in-vessel handling system 28 includes a rotating plug 48 and a rotating plug 50 that are both vertically spaced apart from the top of the nuclear fission reactor core 12. The rotating plug 50 is smaller than the rotating plug 48 and is disposed on top of the rotating plug 48. An offset arm machine 52 extends through the rotating plug 48 to the top of the nuclear fission reactor core 12. The offset arm machine 52 is rotatable through the rotating plug 48. A straight pull machine 54 extends through the rotating plug 50 to the top of the nuclear fission reactor core 12.

Lower ends of the offset arm machine 52 and the straight pull machine 54 include suitable gripping devices, such as grapples or the like, that enable gripping of selected fissile nuclear fuel assemblies 18 and fertile nuclear fuel assemblies 20a and 20b (and in some applications, as will be discussed below, neutron absorber assemblies disposed in the peripheral core region 24) by the offset arm machine 52 and the straight pull machine 54 during movement operations.

Rotation of the rotating plugs 48 and 50 and the offset arm machine 52 allows the offset arm machine 52 and the straight pull machine 54 to be localized to any desired position for pulling a selected assembly out of the nuclear fission reactor core 12 and for re-inserting the selected assembly into the nuclear fission reactor core 12 at any desired empty location.

In some embodiments the in-vessel handling system 28 may be further configured to move ones of the neutron absorber assemblies among selected locations in the peripheral core region 24. In such cases, the locations in the peripheral core region 24 may be selected from predetermined radial locations in the peripheral core region 24 based upon a predetermined burnup level of nuclear fuel assemblies 18, 20a, and/or 20b (depending upon stage of core life and burnup levels) that are located in the peripheral core region 24. In some other embodiments, the in-vessel handling system 28 may be further configured to rotate ones of the neutron absorber assemblies.

In some other embodiments, the in-vessel handling system 28 may be further configured to shuffle ones of the fissile nuclear fuel assemblies 18 and ones of the fertile nuclear fuel assemblies 20a and/or 20b (depending upon stage of core life and burnup levels) between the central core region 16 and a portion of the reactor vessel 14 that is located as desired exterior the nuclear fission reactor core 12.

In-Core Components

Given by way of nonlimiting overview, in embodiments of the nuclear fission reactor core 12 a sufficient number of fissile nuclear fuel assemblies achieve initial criticality and sufficient breeding to approach a steady state reactor core breed-and-burn (breeding-and-fissioning) condition. The fissile assemblies are primarily located in the central core region 16, which generates most of the core power. Fertile nuclear fuel assemblies are placed in the central core region 16 and the peripheral core region 24 and their number is selected such that reactor operation is possible for up to 40 years or more without the need to bring new fuel into the reactor. The initial core loading is configured to achieve criticality with a small amount of excess reactivity and ascension to full power output shortly after initial reactor startup. Excess reactivity increases because of breeding until a predetermined burnup is achieved in a selected number of fuel assemblies. The reactivity increase is compensated by movable reactivity control assemblies, which are gradually inserted into the core to maintain core criticality.

Still given by way of non-limiting overview, a wave of breeding and fissioning (a "breed-burn wave" is originated in the central core region 16 but does not move through fixed core material. Instead, a "standing" wave of breeding and fissioning ("burning") is established by periodically moving core material in and out of the breed-burn region. This movement of fuel assemblies is referred to as "fuel shuffling" and will be described in more detail later.

Details regarding components within the nuclear fission reactor core 12 will now be discussed by way of non-limiting examples. When relevant, differences over core life in composition and/or burnup levels of fuel assemblies and/or locations of fuel assemblies within the nuclear fission reactor core 12 will be noted.

Regardless of stage of core life, the central core region 16 includes the movable reactivity control assemblies 22. The movable reactivity control assemblies 22 suitably may be provided as control rods and may be moved axially in and/or out of the central core region 16 by associated control rod drive mechanisms. It will be appreciated that axial position of the movable reactivity control assemblies 22 may be adjusted by the control rod drive mechanisms to insert neutron absorbing material into the central core region 16 and/or to remove neutron absorbing material from the central core region 16 as desired (such as to compensate for increases in reactivity, to compensate for decreases in reactivity, to shut down the reactor for planned shutdowns, and/or to start up the reactor after the reactor has been shut down). It will also be appreciated that in some embodiments the movable reactivity control assemblies 22 may perform safety functions, shut as rapidly inserting neutron absorbing material to rapidly shut down the reactor (that is, scramming the reactor). In some embodiments, neutron absorbing material disposed in the movable reactivity control assemblies 22 may include hafnium hydride.

Also regardless of stage of core life, the peripheral core region 24 includes the neutron absorber assemblies 26. Unlike the movable reactivity control assemblies 22 (which may be moved during reactor operation as desired, such as to compensate for increases in reactivity), the neutron absorber assemblies 26 remain in-place and do not move during reactor operation. The neutron absorber assemblies 26 help maintain a low core power level in the peripheral core region 24. This low power level helps to simplify coolant flow requirements in the peripheral core region 24. This low power level also helps to mitigate further increases in burnup in fuel assemblies that previously have been used for power production in the central core region 16 and subsequently have been moved from the central core region 16 to the peripheral core region 24. In some embodiments, neutron absorbing material disposed in the neutron absorber assemblies 26 may include hafnium hydride.

However, as discussed above, in some embodiments, if desired the neutron absorber assemblies 26 may be moved by the in-vessel handling system 28 among selected locations in the peripheral core region 24. As mentioned above, the locations in the peripheral core region 24 may be selected from predetermined radial locations in the peripheral core region 24 based upon a predetermined burnup level of nuclear fuel assemblies 18, 20a, and/or 20b (depending upon stage of core life and burnup levels) that are located in the peripheral core region 24. As also discussed above, in some other embodiments the neutron absorber assemblies 26 may be rotated by the in-vessel handling system 28.

Now that the movable reactivity control assemblies 22 and the neutron absorber assemblies 26 have been discussed, the nuclear fuel assemblies 18, 20a, and 20b will be discussed. As mentioned above, this discussion includes references to various stages of core life.

Regardless of stage of core life, fertile material in the fertile nuclear fuel assemblies 20 (that is, the fertile nuclear fuel assemblies 20a and the fertile nuclear fuel assemblies 20b) includes $U^{238}$. In various embodiments, the $U^{238}$ may include natural uranium and/or depleted uranium. Thus, in various embodiments at least one of the fertile nuclear fuel assemblies 20a may include $U^{238}$ that includes natural uranium. In some other embodiments, at least one of the fertile nuclear fuel assemblies 20a may include $U^{238}$ that includes depleted uranium. In some embodiments, at least one of the fertile nuclear fuel assemblies 20b may include $U^{238}$ that includes natural uranium. In some embodiments, at least one of the fertile nuclear fuel assemblies 20b may include $U^{238}$ that includes depleted uranium. That is, at any point in core life any one or more of the nuclear fuel assemblies 20a may include $U^{238}$ that includes natural uranium, any one or more of the nuclear fuel assemblies 20a may include $U^{238}$ that includes depleted uranium, any one or more of the nuclear fuel assemblies 20b may include $U^{238}$ that includes natural uranium, and/or any one or more of the nuclear fuel assemblies 20b may include $U^{238}$ that includes depleted uranium.

Thus, regardless of stage of core life, the $U^{238}$ in the fertile nuclear fuel assemblies 20a and/or 20b need not be limited to any one of natural uranium or depleted uranium. Therefore, at any stage in core life, one or more of the nuclear fuel assemblies 20a may include natural uranium, one or more of the nuclear fuel assemblies 20a may include depleted uranium, one or more of the nuclear fuel assemblies 20b may include natural uranium, and/or one or more of the nuclear fuel assemblies 20b may include depleted uranium.

At beginning of life (BOL), in various embodiments the central core region 16 includes the fissile nuclear fuel assemblies 18, the fertile nuclear fuel assemblies 20a, and the movable reactivity control assemblies 22, and the peripheral core region includes the fertile nuclear fuel assemblies 20b and the neutron absorber assemblies 26. The fertile nuclear fuel assemblies 20a and 20b, the movable reactivity control assemblies 22, and the neutron absorber assemblies 26 have been discussed above for all stages of core life, including BOL.

At BOL, the central core region 16 includes the fissile nuclear fuel assemblies 18 and the fertile nuclear fuel assemblies 20, and during core life (and possibly at end-of-life) the central core region 16 includes the fissile nuclear fuel assemblies 18 and the fertile nuclear fuel assemblies 20a and/or 20b. The nuclear fuel assemblies 18 and 20 may be arranged as desired within the central core region 16. In some embodiments, the nuclear fuel assemblies 18 and 20 may be arranged symmetrically within the central core region 16.

At BOL, the fissile nuclear fuel assemblies 18 include enriched fissile nuclear assemblies 18a. In various embodiments, enriched fissile material in the enriched fissile nuclear assemblies 18a includes $U^{235}$. Uranium in the enriched fissile nuclear fuel assemblies 18a is typically enriched less than twenty percent (20%) in the $U^{235}$ isotope. It will be appreciated that in some embodiments (such as the first of a fleet of the nuclear fission reactors 10), at BOL all of the fissile material in the fissile nuclear fuel assemblies 18a includes $U^{235}$.

However, in other embodiments (such as in later nth-of-a-kind members of a fleet of the nuclear fission reactors 10), as will be discussed below at BOL at least some of the fissile material in the fissile nuclear fuel assemblies 18a may include $Pu^{239}$ (that has been bred in previous members of the fleet of nuclear fission reactors 10).

It will be further appreciated that only a small mass of fissile nuclear fuel material (relative to the total mass of nuclear fuel material, including fertile nuclear fuel material, included in the nuclear fission reactor core 10 and, as will be appreciated, as opposed to a conventional fast breeder reactor) is entailed in initiating a breeding-and-fissioning (breed-burn) wave in the nuclear fission reactor core 10. Illustrative initiation and propagation of a breeding-and-fissioning (breed-burn) wave is described by way of example and not of limitation in U.S. patent application Ser. No. 11/605,943, entitled AUTOMATED NUCLEAR POWER REACTOR FOR LONG-TERM OPERATION, naming RODERICK A. HYDE, MURIEL Y. ISHIKAWA, NATHAN P. MYHRVOLD, AND LOWELL L. WOOD, JR. as inventors, filed 28 Nov. 2006, the contents of which are hereby incorporated by reference. It will further be noted that it is within the capacity of a person of skill in the art of nuclear fission reactor design and operation to determine, without undue experimentation, the amount of fissile nuclear fuel material that is entailed in initiating a breeding-and-fissioning (breed-burn) wave in a nuclear fission reactor core 10 of any size as desired.

It will also be appreciated that a breed-burn wave does not move through fixed core material. Instead, a "standing" wave of breeding and burning (fissioning) is established by periodically moving core material in and out of the breed-burn region. This movement of fuel assemblies is referred to as "fuel shuffling" and will be described in more detail later.

It will be appreciated that after BOL the nuclear fission reactor 10 has been started up and the enriched fissile nuclear fuel assemblies 18a have begun fissioning. Some of the neutrons may be absorbed by nuclei of fertile material, such as $U^{238}$, in the fertile nuclear fuel assemblies 20a in the central core region 16. As a result of such absorption, in some instances the $U^{238}$ will be converted via capture to $U^{239}$, then via β decay to $Np^{239}$, then via further β decay to $Pu^{239}$. Thus, in such cases the fertile material (that is, $U^{238}$) in the fertile nuclear fuel assemblies 20a will have been bred to fissile material (that is, $Pu^{239}$) and, as a result, such fertile nuclear fuel assemblies 20a will have been converted into bred nuclear fuel assemblies 18b.

Therefore, it will be appreciated that after BOL the fissile nuclear fuel assemblies 18 in the central core region 16 include the enriched fissile nuclear fuel assemblies 18a and the bred fissile nuclear fuel assemblies 18b. As discussed above, fissile material in the enriched fissile nuclear fuel assemblies 18a may include $U^{235}$ and fissile material in the bred fissile nuclear fuel assemblies 18b may include $PU^{239}$.

Some of the other neutrons may be absorbed by other nuclei of fertile material, such as $U^{238}$, in the fertile nuclear fuel assemblies 20a in the central core region 16. As a result of such absorption, in some other instances it will be appreciated that the $U^{238}$ in some of the fertile nuclear fuel assemblies 20a may undergo fast fission.

It will be further appreciated that, after BOL, some neutrons may leak from the central core region 16 to the peripheral core region 24. In such cases, some of the leaked neutrons may be absorbed by fertile material (such as $U^{238}$) in the fertile nuclear fuel assemblies 20b in the peripheral core region 24. As a result of such absorption and as discussed above, in some instances the $U^{238}$ will be converted via capture to $U^{239}$, then via β decay to $Np^{239}$, then via further β decay to $Pu^{239}$. Thus, in such cases the fertile material (that is, $U^{238}$) in the fertile nuclear fuel assemblies 20b will have been bred to fissile material (that is, $Pu^{239}$) and, as a result, such fertile nuclear fuel assemblies 20b will have been converted into bred nuclear fuel assemblies 18b. Thus, in such cases, after BOL the peripheral core region 24 may include ones of the bred fissile nuclear fuel assemblies 18b.

Some of the other leaked neutrons may be absorbed by other nuclei of fertile material, such as $U^{238}$, in the fertile nuclear fuel assemblies 20b in the peripheral core region 24. As a result of such absorption, in some other instances it will be appreciated that the $U^{238}$ in some of the fertile nuclear fuel assemblies 20b may undergo fast fission. As discussed above, the neutron absorber assemblies 26 help maintain a low power level in the peripheral core region even though fast fission of $U^{238}$ in the fertile nuclear fuel assemblies 20b in the peripheral core region 24 may occur.

The enriched fissile nuclear fuel assemblies 18a will undergo burnup after BOL. After some time after BOL, the enriched fissile nuclear fuel assemblies 18a will accumulate sufficient burnup such that it will be desired to shuffle (or move) such enriched fissile nuclear fuel assemblies 18a from the central core region 16 to the peripheral core region 24 (with the in-vessel handling system 28). It will be appreciated that a person of skill in the art of nuclear fission reactor design and operation will be able to determine, without undue experimentation, a burnup level at which one of the enriched fissile nuclear fuel assemblies 18a is to be shuffled from the central core region 16 to the peripheral core region 24. Thus, in such cases, the peripheral core region 24 may further include selected ones of the enriched fissile nuclear fuel assemblies 18a having at least a predetermined burnup level.

Likewise, the bred fissile nuclear fuel assemblies 18b will also undergo burnup after BOL. After some time after BOL, the bred fissile nuclear fuel assemblies 18b will accumulate sufficient burnup such that it will be desired to shuffle (or move) such bred fissile nuclear fuel assemblies 18b from the central core region 16 to the peripheral core region 24 (with the in-vessel handling system 28). It will be appreciated that a person of skill in the art of nuclear fission reactor design and operation will be able to determine, without undue experimentation, a burnup level at which one of the enriched fissile nuclear fuel assemblies 18b is to be shuffled from the central core region 16 to the peripheral core region 24. Thus, in such cases, the peripheral core region 24 may further include selected ones of the bred fissile nuclear fuel assemblies 18b having at least a predetermined burnup level.

It will further be appreciated that, as discussed above, some of the fertile nuclear fuel assemblies 20b in the peripheral core region 24 will be converted to the bred fissile nuclear fuel assemblies 18b. As also discussed above, the fertile nuclear fuel assemblies 20b may have been subject to neutron flux levels in the peripheral core region 24 below neutron flux levels in the central core region 16 to which the fertile nuclear fuel assemblies 20a have been subjected. As a result, the peripheral core region 24 may include ones of the bred fissile nuclear fuel assemblies 18b (that is, converted from the fertile nuclear fuel assemblies 20b in the peripheral core region 24) having less than a predetermined burnup level.

During various stages of core life, ones of the neutron absorber assemblies 26 may be moved by the in-vessel handling system 28 among any of several locations in the peripheral core region 24. The locations in the peripheral core region 24 may include predetermined radial locations in the peripheral core region 24 that are selectable based upon a predetermined burnup level of nuclear fuel assemblies 18 and 20 that are located in the peripheral core region 24.

Toward end-of-life (EOL), the enriched fissile nuclear fuel assemblies 18a may have undergone sufficient burnup such that the enriched fissile nuclear fuel assemblies 18a have been shuffled (moved) from the central core region 16 to the peripheral core region 24. Thus, toward EOL the fissile nuclear fuel assemblies 18 that are located in the central core region 16 are the bred fissile nuclear fuel assemblies 18b. Therefore, toward EOL, the fissile nuclear fuel assemblies 18 (in the central core region 16) include the bred fissile nuclear fuel assemblies 18b, and the peripheral core region 24 includes enriched fissile nuclear fuel assemblies 18a having at least a predetermined burnup level.

It will be appreciated that, toward EOL, the peripheral core region may also include bred fissile fuel assemblies 18b. Some of the bred fissile nuclear fuel assemblies 18b in the peripheral core region 24 may include selected ones of the bred fissile nuclear fuel assemblies 18b that have been shuffled from the central core region 16 to the peripheral core region 24 and that have at least a predetermined burnup level. It will further be appreciated that some others of the bred fissile nuclear fuel assemblies 18b in the peripheral core region 24 may include (i) ones of the bred fissile nuclear fuel assemblies 18b that have been shuffled from the central core region 16 to the peripheral core region 24 that have less than a predetermined burnup level and/or (ii) ones of the bred fissile nuclear fuel assemblies 18b that have been converted from ones of the fertile nuclear fuel assemblies 20b (that have resided in the peripheral core region 24) that have less than a predetermined burnup level.

Embodiments of the nuclear fission reactor 10 lend themselves to fuel recycling. Some embodiments of the nuclear fission reactor 10 may discharge their fuel at an average burnup of approximately 15% of initial heavy metal atoms, with axial peaking making the peak burnup in the range of 28-32%. Meanwhile, fissile material bred in various embodiments of the nuclear fission reactor 10 of nominal 'smear' composition may remain critical to over 40% average burnup (even without any fission product removal) via melt refining. Including the effect of periodic melt refining can allow burnups exceeding 50% to be achieved. Therefore, fuel discharged from a first generation nuclear fission reactor 10 still has most of its potential life remaining from a neutronic standpoint (even before any "life extension" associated with thermal removal of fission products during recladding is considered) and would be available for re-use without any need for chemical reprocessing.

To that end and as mentioned above, in some embodiments (such as in later nth-of-a-kind members of a fleet of the nuclear fission reactors 10), at BOL at least some of the fissile material in the fissile nuclear fuel assemblies 18a may include $Pu^{239}$ (that has been bred in previous members of the fleet of nuclear fission reactors 10). In some such cases, one or more of the fissile nuclear fuel assemblies 18 may include fissile material that has been discharged from a nuclear fission reactor. Moreover, in some of these cases the fissile nuclear fuel assemblies 18 that include fissile material that has been discharged from a nuclear fission reactor may include re-clad fissile fuel assemblies.

In such embodiments, the fissile nuclear fuel assemblies 18 may be recycled via fuel recladding—a process in which the old clad is removed and the used fuel is refabricated into new fuel. The fissile fuel material is recycled through thermal and physical (but not chemical) processes. The used fuel assemblies are disassembled into individual fuel rods which then have their cladding mechanically cut away. The used fuel then undergoes a high temperature (1300-1400° C.) melt refining process in an inert atmosphere which separates many of the fission products from the fuel in two main ways: (i) the volatile and gaseous fission products (e.g., Br, Kr, Rb, Cd, I, Xe, Cs) simply escape; while (ii) the more than 95% of the chemically-reactive fission products (e.g., Sr, Y, Te, Ba, and rare earths) become oxidized in a reaction with the zirconia crucible and are readily separated. The melt-refined fuel can then be cast or extruded into new fuel slugs, placed into new cladding with a sodium bond, and integrated into new fuel assemblies.

Referring additionally to FIG. 3, an illustrative nuclear fuel assembly (regardless of whether it is a fissile nuclear fuel assembly 18 or a fertile nuclear fuel assembly 20) includes fuel pins (or fuel rods or fuel elements) 56. In various embodiments, the fuel pins 56 include metal fuel (again, regardless of whether the fuel is fissile fuel or fertile fuel). It will be appreciated that metal fuel offers high heavy metal loadings and excellent neutron economy, which is desirable for the breed-and-burn process in the nuclear fission reactor core 12.

In various embodiments the metal fuel may be alloyed with about 3% to about 8% zirconium to dimensionally stabilize the alloy during irradiation and to inhibit low-temperature eutectic and corrosion damage of the cladding. A sodium thermal bond fills the gap that exists between the alloy fuel and the inner wall of the clad tube to allow for fuel swelling and to provide efficient heat transfer which keeps the fuel temperatures low. Individual fuel pins 56 may have a thin wire 58 from about 0.8 mm diameter to about 1.6 mm diameter helically wrapped around the circumference of the clad tubing to provide coolant space and mechanical separation of individual fuel pins 56 within the housing of the fuel assembly 18 and 20 (that also serves as the coolant duct). In various embodiments the cladding, wire wrap, and housing may be fabricated from ferritic-martensitic steel because of its irradiation performance as indicated by a body of empirical data.

Large power differences between the fissile nuclear fuel assemblies 18 in the central core region 16 and the fertile nuclear fuel assemblies 20a and/or 20b in the peripheral core region 24 entail significant differences in assembly flow distribution to match flow to power and thus outlet temperature. In various embodiments this flow distribution is accomplished through orifices, such as a combination of fixed and variable orifices, which make it possible to optimize primary coolant flow proportionally to predicted assembly power.

Figure 4A:
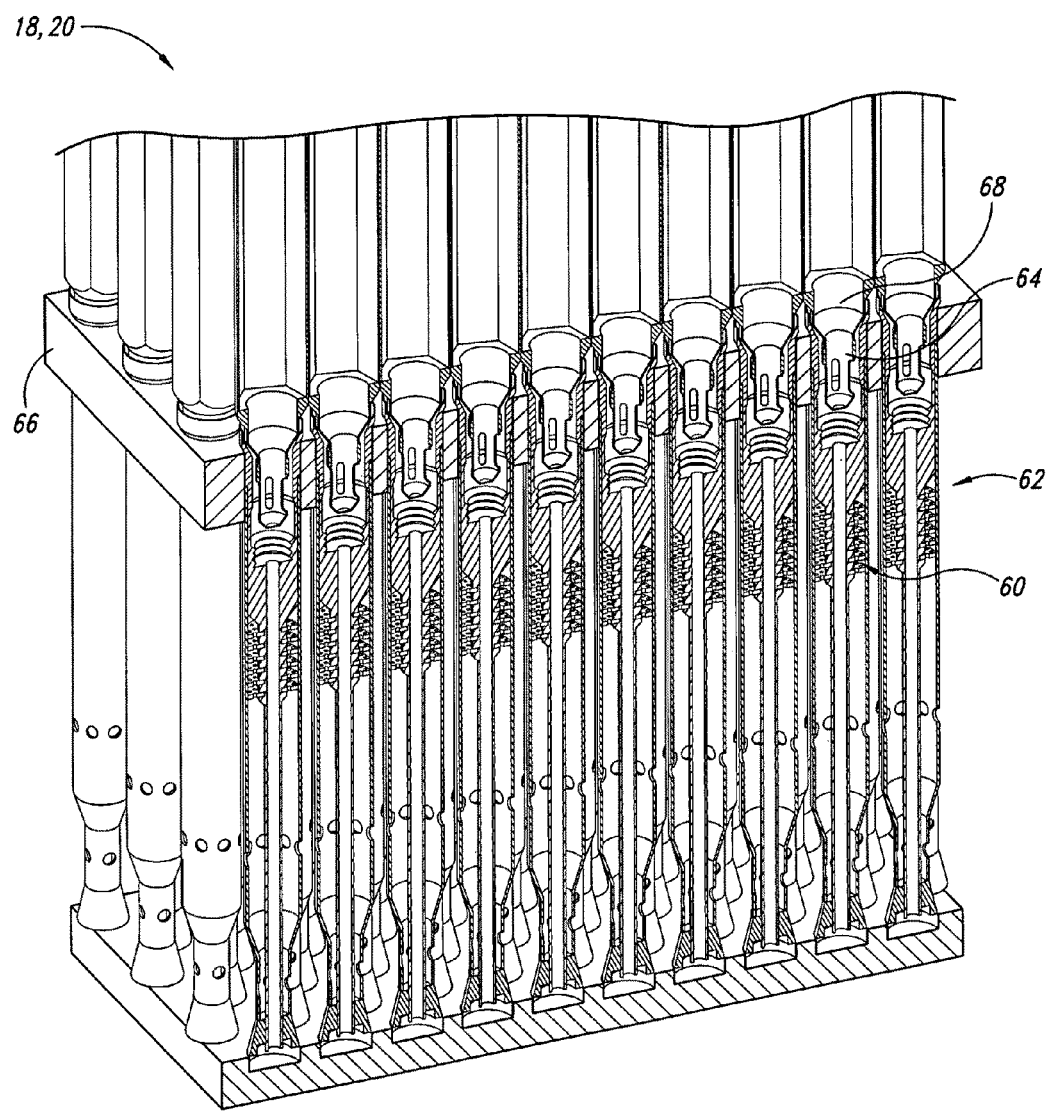
FIG. 4A is a partial-cutaway perspective view in schematic form of illustrative fuel assembly flow receptacles.

Referring now to FIG. 4A, in various embodiments orifices 60, such as fixed orifices, are installed in fuel assembly flow receptacles 62 below the nuclear fission reactor core 12. The fuel assembly flow receptacles 62 mate with seats 64 in a core support grid plate 66 and contain sockets 68 where the nuclear fuel assemblies 18 and 20 are inserted.

The fuel assembly flow receptacles 62 have orifices 60 that may be used to match flow to power generated in the nuclear fuel assemblies. For example, the fuel assembly flow receptacles 62 under the peripheral core region 24 have very high-pressure-drop orifices 60 to minimize the flow into very low-power fertile nuclear fuel assemblies 20. On the other hand, the fuel assembly flow receptacles 62 below the nuclear fuel assemblies 18 and 20 in the central core region 16 may be divided into several groups having orifices 60 ranging from very low resistance to higher resistance to match the radial power profile in the central core region 16.

In addition to the fixed orifices 60, in some embodiments each nuclear fission fuel assembly 18 and 20 may have an ability to adjust assembly flow by rotation during fuel shuffling operations to enable minor flow adjustments at the assembly level, if desired.

Thus, in some embodiments, the fuel assembly flow receptacles 62 may define a group of reactor coolant flow orifices 60 in the central core region 16 and another group of reactor coolant flow orifices 60 in the peripheral core region 24. The group of reactor coolant flow orifices 60 in the central core region 16 may includes reactor coolant flow orifice groups. In such cases, flow rate through a selected one of the reactor coolant flow orifice groups may be based upon a power profile at a radial location of the selected one of the reactor coolant flow orifice groups. Moreover, flow rate through the reactor coolant flow orifices 60 in the peripheral core region 24 may include a predetermined flow rate based upon power level in the peripheral core region 24.

In various embodiments, the orifices 60 include fixed orifices. In other embodiments, variable orifices may be provided (via rotation of the nuclear fuel assemblies 18 and 20). In some other embodiments, the orifices 60 may include fixed orifices and variable orificing may also be provided (via rotation of the nuclear fuel assemblies 18 and 20).

Figure 4B:
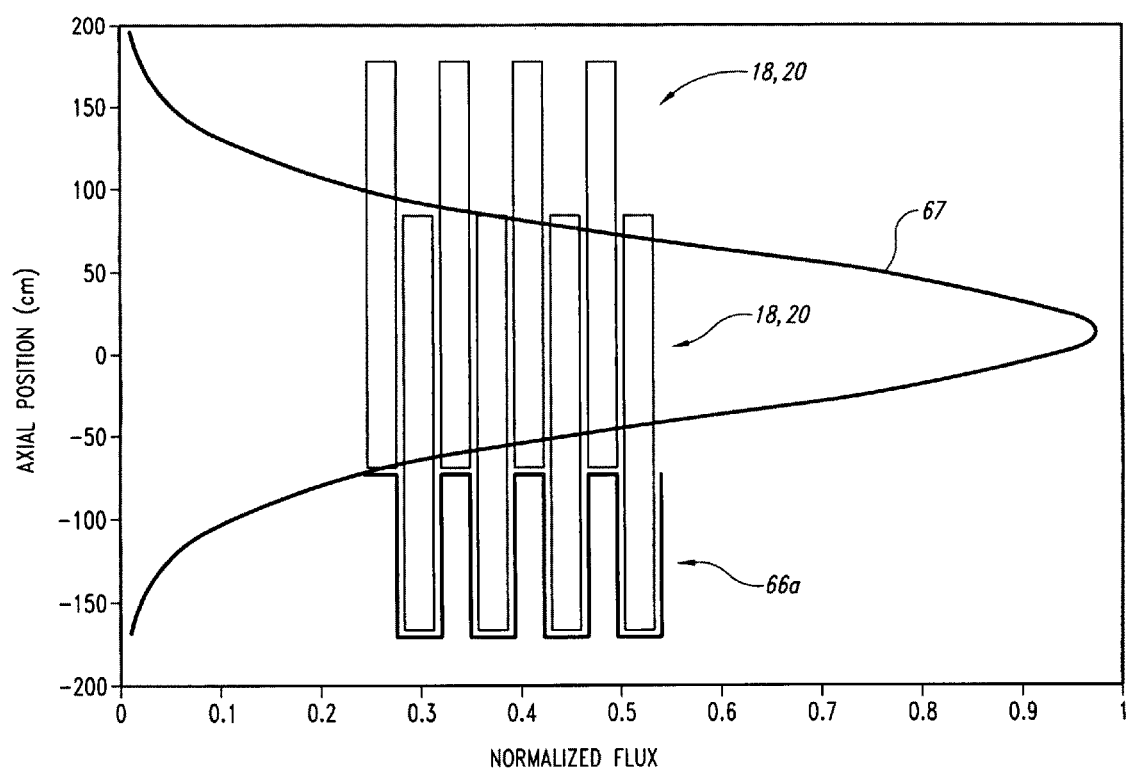
FIG. 4B illustrates a graph of relative flux distribution overlaid with a side plan view in schematic form of an illustrative stepped core support grid plate.

In some other embodiments and referring additionally to FIG. 4B, a core support grid plate 66a may be "stepped". That is, the stepped core support grid plate 66a may be used to offset the nuclear fuel assemblies 18 and 20 axially. As such, the stepped core support grid plate 66a allows changing position of the nuclear fuel assemblies 18 and 20 in the axial direction as a function of their position in the radial direction.

Utilization of fuel in the nuclear fission reactor core 12 may be further increased by offsetting the assemblies axially (in addition to shuffling the nuclear fuel assemblies 18 and 20 radially). It will be appreciated that relative neutron flux distribution is higher in the central axial zone of the nuclear fission reactor core 12 than in the axial extents of the nuclear fission reactor core 12, as shown by curve 67. Such axially offsetting can allow for fuel bred near the axial extents of the fertile nuclear fuel assemblies 20 to be moved closer to (or, if needed, further from) the central axial zone of the nuclear fission reactor core 12. Such offsetting can thus allow for a higher degree of control of burn-up in the axial dimension, which can further help yield higher fuel utilization.

In some embodiments the stepped core support grid plate 66a may include a single axially-sectioned assembly. In some embodiments the level of offset could be fixed and could include a pre-determined fuel management strategy. In some other embodiments the level of offset may be altered through the use of spacers, such as risers or shims or the like, that may be installed at the bottom of the nuclear fuel assemblies 18 and 20 or directly onto the stepped core support grid plate 66a.

Aspects of operation of embodiments of the nuclear fission reactor core 12 will be explained.

It will be appreciated that various design features of embodiments of the nuclear fission reactor core 10 can help increase the maximum burnup and fluence the fuel can sustain before the accumulation of fission products makes the fuel subcritical.

For example, the fissile nuclear fuel assemblies 18 in the central core region 16 are surrounded by subcritical feed fuel (that is, the fertile nuclear fuel assemblies 20 in the central core region 16 and in the peripheral core region 24), which absorbs leakage neutrons and uses them to breed new fuel. It will be appreciated by those of skill in the art of nuclear reactor design and operation that past a thickness of feed fuel surrounding the central core region 16 of approximately 70 cm (or, depending upon size of the fertile nuclear fuel assemblies 20, about 5 assembly rows) the fraction of neutrons leaking from the nuclear fission reactor core 12 is reduced toward zero.

Such neutron conserving features accomplish two things. First, they minimize the burnup and fluence entailed in achieving breeding-and-fissioning wave propagation, which in turn eases material degradation issues and enables embodiments of the nuclear fission reactor 10 to be made with existing materials. Second, they increase the maximum burnup and fluence the fuel can sustain before the accumulation of fission products makes the fuel subcritical. This second point is illustrated in FIG. 6A.

Figure 6A:
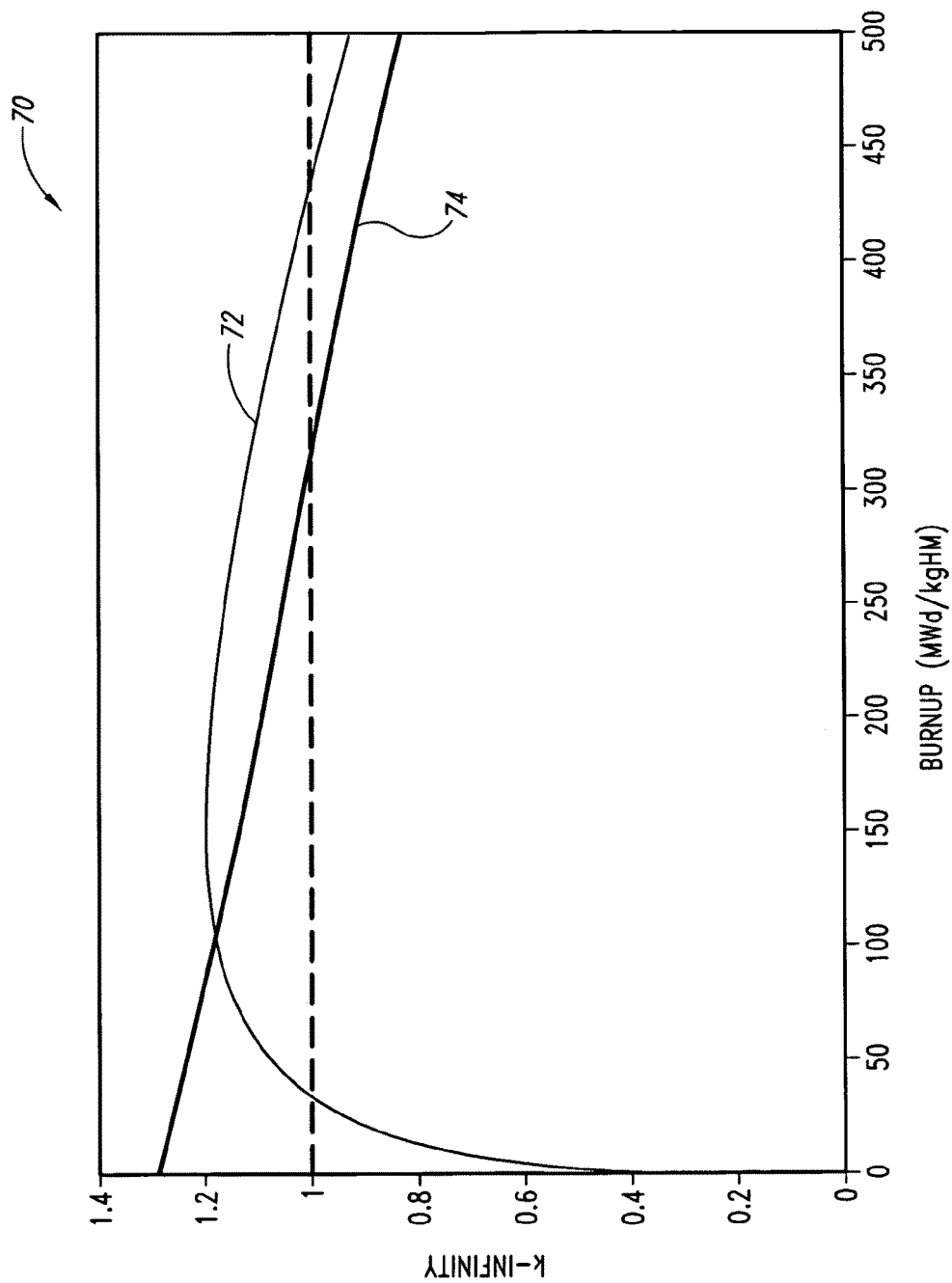
FIGS. 6A and 6B are illustrative graphs of reactivity versus burnup.

Referring additionally to FIG. 6A, a graph 70 graphs reactivity versus burnup for illustrative embodiments of the nuclear fission reactor core 12 along a curve 72. The graph 70 compares the reactivity evolution of feed fuel in illustrative embodiments of the nuclear fission reactor core 12 (illustrated along the curve 72) with the reactivity evolution of enriched fuel from a typical sodium fast reactor which is illustrated along a curve 74. The enriched fuel from a typical sodium fast reactor is modeled as having SuperPhenix fuel, coolant and structure volume fractions with 75% smear density, and an initial enrichment of 16%. As is known, typical sodium fast reactor fuel must start at a high enrichment to achieve criticality, and the excess reactivity of fresh fuel is lost to control elements, absorption in the breeding blanket, and leakage from the core. As shown by the curve 74, the typical sodium fast reactor fuel quickly loses reactivity as $U^{235}$ is depleted, and it becomes subcritical at approximately 310 MWd/kgHM burnup. At the point where the typical sodium fast reactor fuel becomes subcritical, about half of the total fissions are due to $U^{235}$, and the utilization fraction of $U^{238}$ is less than 20%.

Meanwhile, as shown by the curve 72, feed fuel in embodiments of the nuclear fission reactor core 12 begins as subcritical fertile fuel in the fertile nuclear fuel assemblies 20 and gains reactivity as $Pu^{239}$ is bred in. Once the fuel becomes critical, excess reactivity is offset by breeding additional subcritical feed fuel (it will be noted that during the first 50 MWd/kgHM of burn-up, the driver fuel makes the reactor critical). A total fuel burnup of up to 400 MWd/kgHM or higher can be achieved before the fuel becomes subcritical, and since the fuel begins as nearly all $U^{238}$, the $U^{238}$ utilization fraction can be greater than 40%.

Figure 6B:
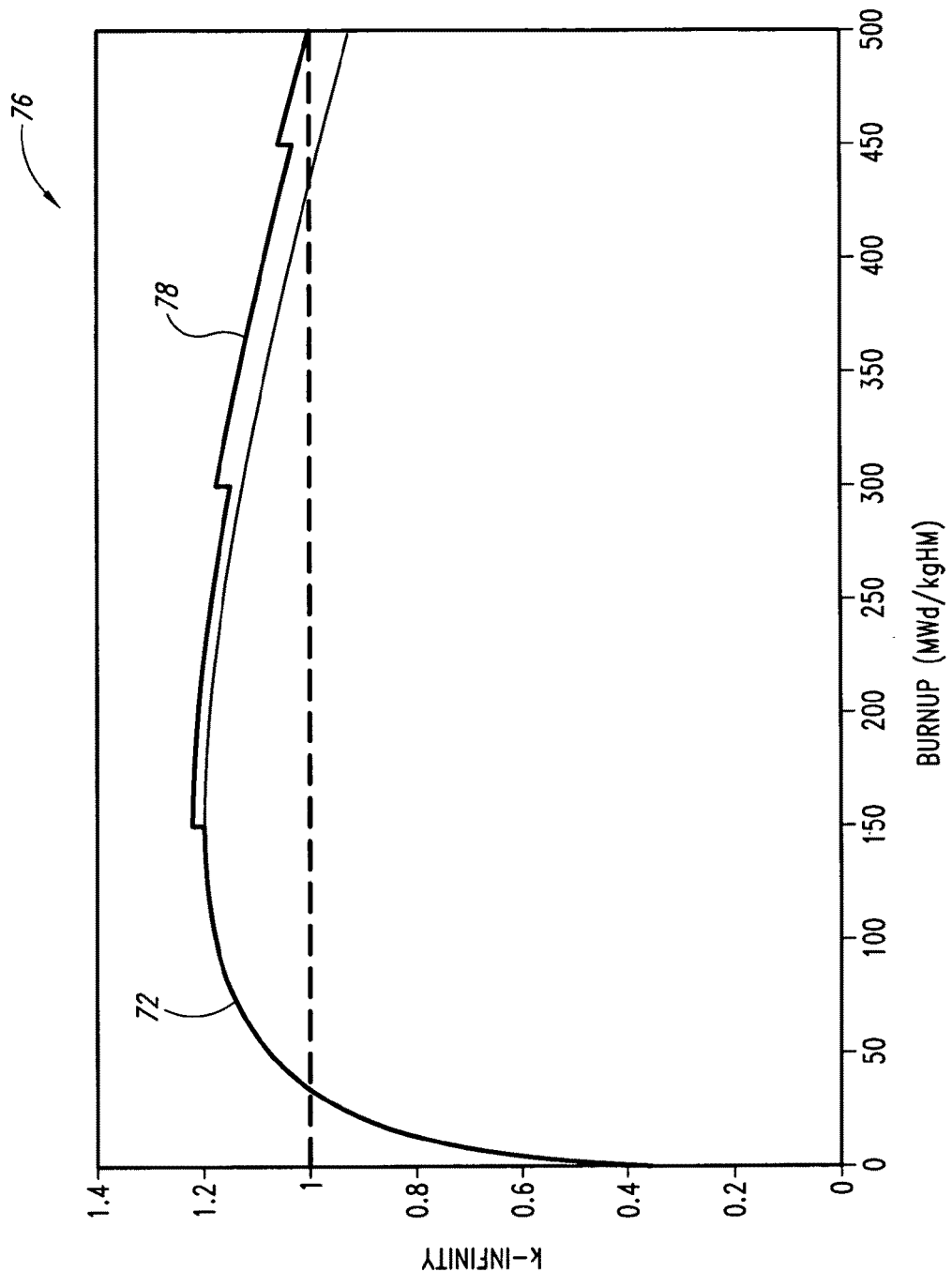

Referring additionally to FIG. 6B, a graph 76 of reactivity versus burnup shows effects of periodic thermal removal of fission products along a curve 78. The graph 76 also includes the graph 72 for feed fuel without thermal removal of fission products. Embodiments of the nuclear fission reactor core 12 are presently designed to discharge their fuel at an average burnup of approximately 15% of initial heavy metal atoms, with axial peaking making the peak burnup in the range of 28-32%. Meanwhile, as shown by the curve 72, feed fuel bred in an illustrative nuclear fission reactor core 12 of nominal 'smear' composition remains critical to over 40% average burnup, even without any fission product removal via melt refining. Including the effect of periodic melt refining, as shown by the curve 78, allows burn-ups exceeding 50% to be achieved. Therefore, fuel discharged from a first generation nuclear fission reactor 10 still has most of its potential life remaining from a neutronic standpoint (even before any "life extension" associated with thermal removal of fission products during recladding is considered) and would be available for reuse without any need for chemical reprocessing.

Figure 7:
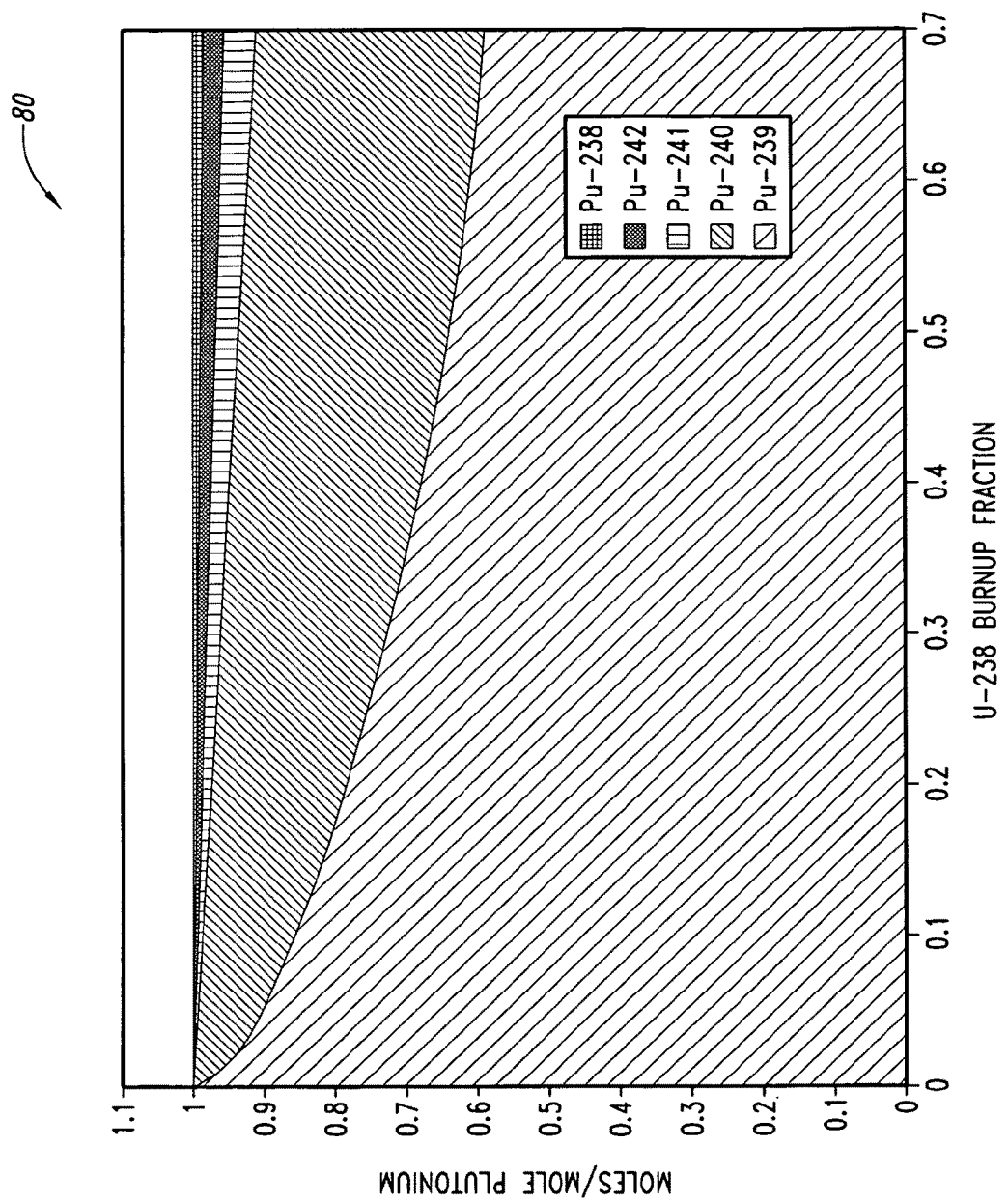
FIG. 7 is an illustrative graph of plutonium isotope evolution versus utilization of $U^{238}$.

Referring now to FIG. 7, a graph 80 illustrates plutonium isotope evolution versus utilization of $U^{238}$. At low utilization, the plutonium produced is substantially all $Pu^{239}$, since operation begins with $U^{238}$ and no plutonium. At higher utilizations, the plutonium quality becomes increasingly degraded as higher isotopes of plutonium are created. At the point which the feed fuel's k-infinity falls below unity (as shown by the curve 72 in FIGS. 6A and 6B), the fissile plutonium fraction is under 70%, similar to reactor-grade plutonium from LWR spent fuel. Additionally, the plutonium in spent fuel from embodiments of the nuclear fission reactor 10 is contaminated to a much higher degree with fission products, thereby making it more difficult to handle and reprocess and less attractive for diversion to weapons purposes.

Illustrative Methods

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Figure 8A:
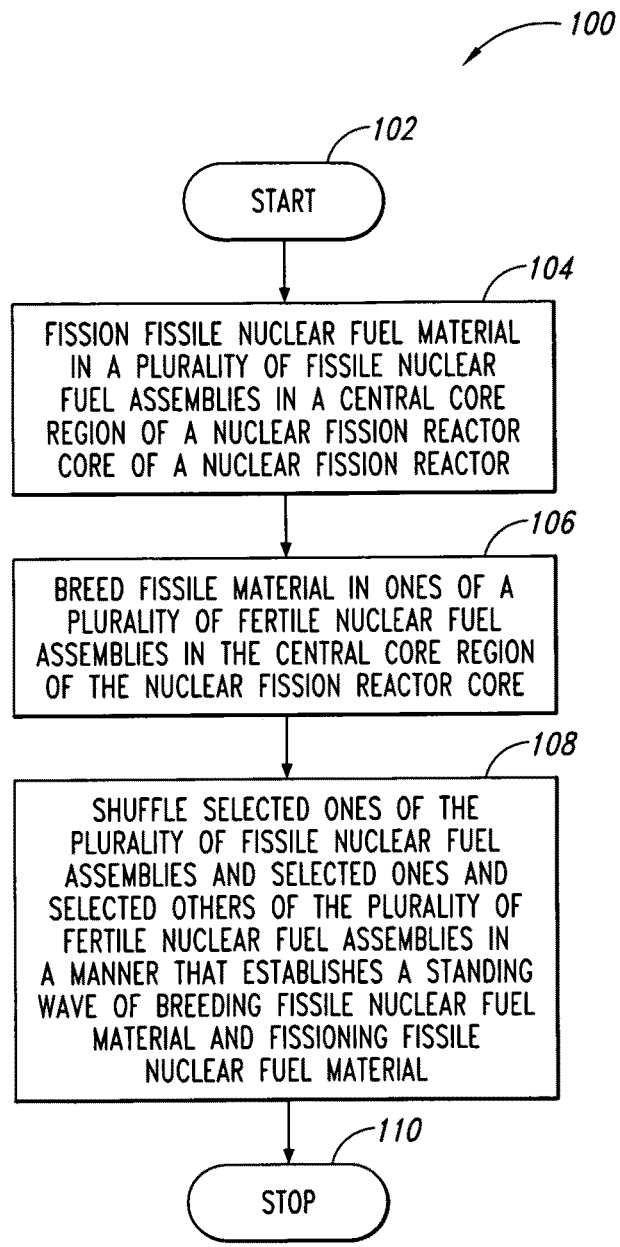
FIG. 8A is a flowchart of an illustrative method of operating a nuclear fission reactor.

Given by way of overview and referring now to FIG. 8A, a method 100 is provided for operating a nuclear fission reactor. The method 100 starts at a block 102. At a block 104 fissile nuclear fuel material is fissioned in a plurality of fissile nuclear fuel assemblies in a central core region of a nuclear fission reactor core of a nuclear fission reactor. At a block 106 fissile material is bred in ones of a plurality of fertile nuclear fuel assemblies in the central core region of the nuclear fission reactor core. At a block 108 selected ones of the plurality of fissile nuclear fuel assemblies and selected ones and selected others of the plurality of fertile nuclear fuel assemblies are shuffled in a manner that establishes a standing wave of breeding fissile nuclear fuel material and fissioning fissile nuclear fuel material. The method 100 stops at a block 110. Details will be set forth below by way of non-limiting examples.

Figure 8B:
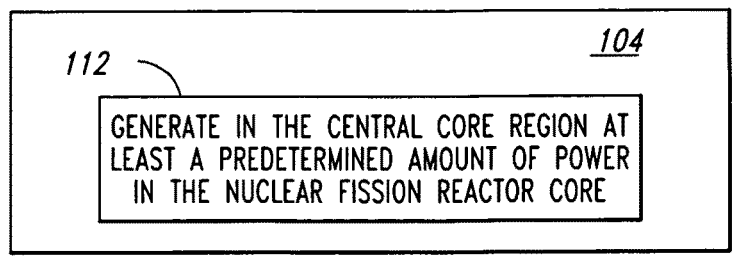
FIGS. 8B-8Y are flowcharts of illustrative details of the method of FIG. 8A.

Referring to FIG. 8B, in some embodiments fissioning fissile nuclear fuel material in a plurality of fissile nuclear fuel assemblies in a central core region of a nuclear fission reactor core of a nuclear fission reactor at the block 104 may include generating in the central core region at least a predetermined amount of power in the nuclear fission reactor core at a block 112.

Figure 8C:
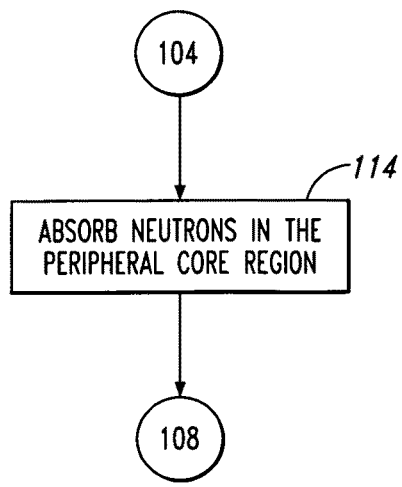

Referring to FIG. 8C, in some embodiments neutrons may be absorbed in a peripheral core region at a block 114.

Figure 8D:
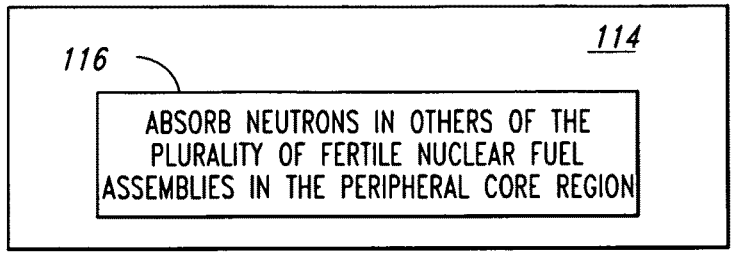

Referring to FIG. 8D, in some embodiments absorbing neutrons in a peripheral core region at the block 114 may include absorbing neutrons in others of the plurality of fertile nuclear fuel assemblies in the peripheral core region at a block 116.

Figure 8E:
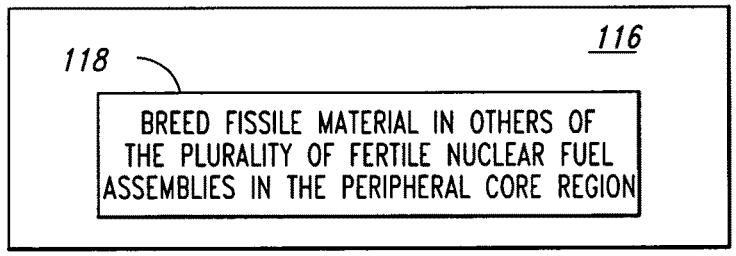

Referring to FIG. 8E, in some embodiments absorbing neutrons in others of the plurality of fertile nuclear fuel assemblies in the peripheral core region at the block 116 may include breeding fissile material in others of the plurality of fertile nuclear fuel assemblies in the peripheral core region at a block 118.

Figure 8F:
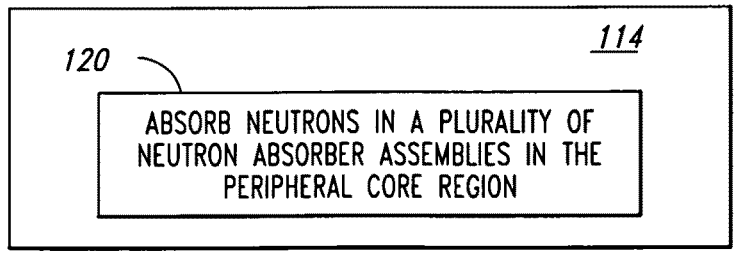

Referring to FIG. 8F, in some embodiments absorbing neutrons in a peripheral core region at the block 114 may include absorbing neutrons in a plurality of neutron absorber assemblies in the peripheral core region at a block 120.

Figure 8G:
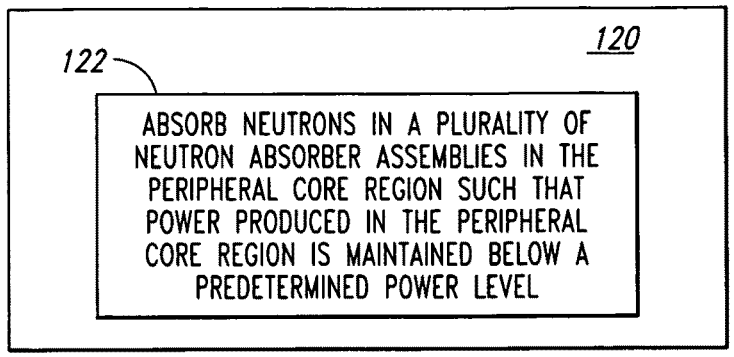

Referring to FIG. 8G, in some embodiments absorbing neutrons in a plurality of neutron absorber assemblies in the peripheral core region at the block 120 may include absorbing neutrons in a plurality of neutron absorber assemblies in the peripheral core region such that power produced in the peripheral core region is maintained below a predetermined power level at a block 122.

Figure 8H:
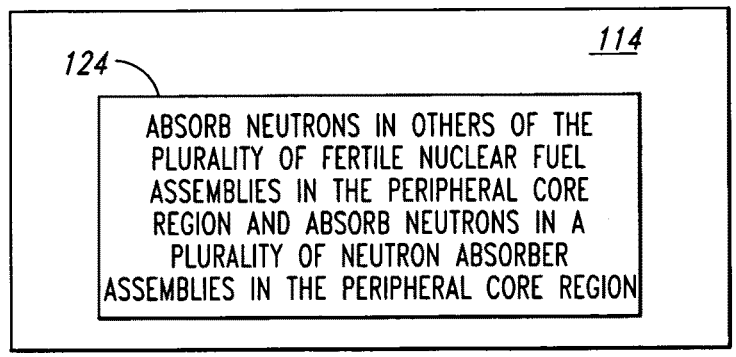

Referring to FIG. 8H, in some embodiments absorbing neutrons in a peripheral core region at the block 114 may include absorbing neutrons in others of the plurality of fertile nuclear fuel assemblies in the peripheral core region and absorbing neutrons in a plurality of neutron absorber assemblies in the peripheral core region at a block 124.

Figure 8I:
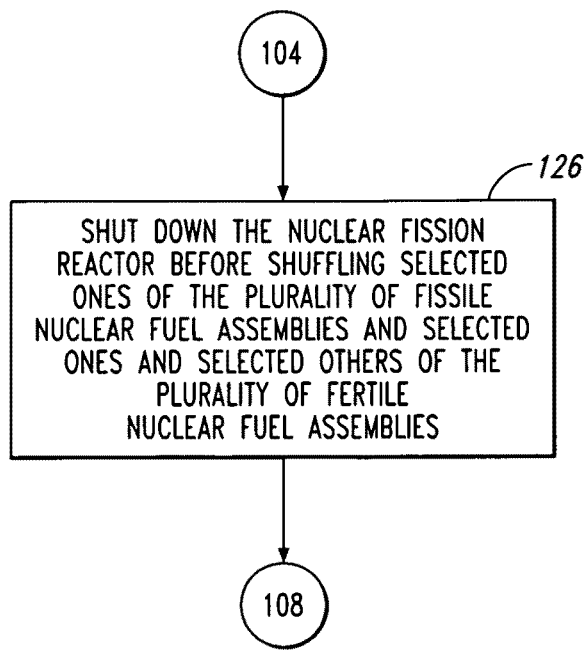

Referring to FIG. 8I, in some embodiments at a block 126 the nuclear fission reactor may be shut down before shuffling selected ones of the plurality of fissile nuclear fuel assemblies and selected ones and selected others of the plurality of fertile nuclear fuel assemblies.

Figure 8J:
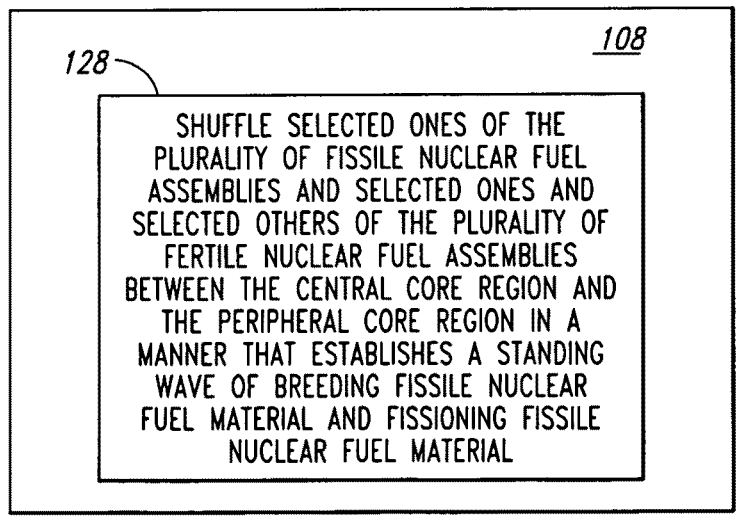

Referring to FIG. 8J, in some embodiments shuffling selected ones of the plurality of fissile nuclear fuel assemblies and selected ones and selected others of the plurality of fertile nuclear fuel assemblies in a manner that establishes a standing wave of breeding fissile nuclear fuel material and fissioning fissile nuclear fuel material at the block 108 may include shuffling selected ones of the plurality of fissile nuclear fuel assemblies and selected ones and selected others of the plurality of fertile nuclear fuel assemblies between the central core region and the peripheral core region in a manner that establishes a standing wave of breeding fissile nuclear fuel material and fissioning fissile nuclear fuel material at a block 128.

Figure 8K:
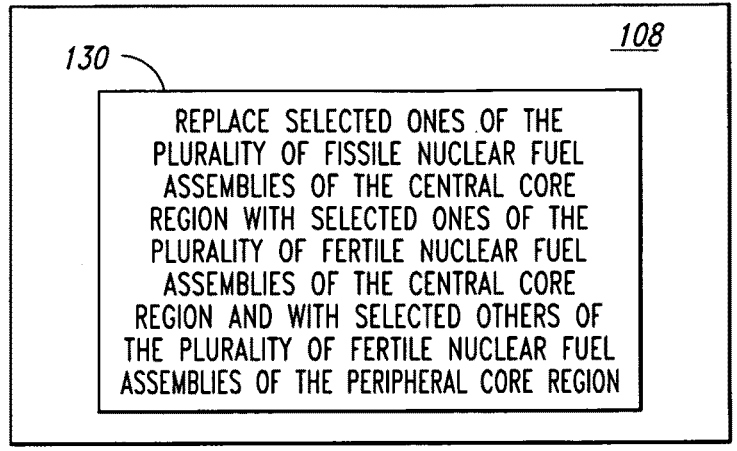

Referring to FIG. 8K, in some embodiments shuffling selected ones of the plurality of fissile nuclear fuel assemblies and selected ones and selected others of the plurality of fertile nuclear fuel assemblies at the block 108 may include replacing selected ones of the plurality of fissile nuclear fuel assemblies of the central core region with selected ones of the plurality of fertile nuclear fuel assemblies of the central core region and with selected others of the plurality of fertile nuclear fuel assemblies of the peripheral core region at a block 130.

Figure 8L:
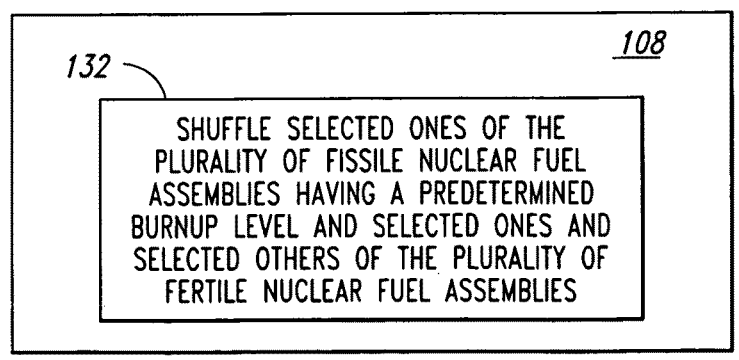

Referring to FIG. 8L, in some embodiments shuffling selected ones of the plurality of fissile nuclear fuel assemblies and selected ones and selected others of the plurality of fertile nuclear fuel assemblies at the block 108 may include shuffling selected ones of the plurality of fissile nuclear fuel assemblies having a predetermined burnup level and selected ones and selected others of the plurality of fertile nuclear fuel assemblies at a block 132.

Figure 8M:
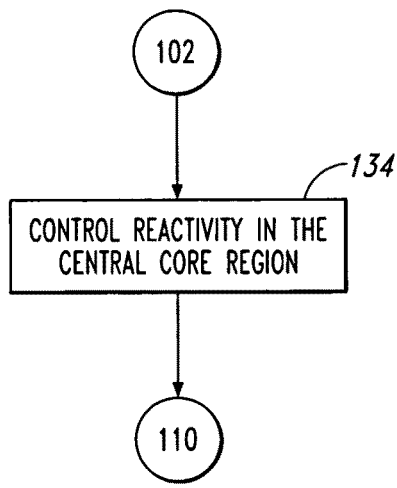

Referring to FIG. 8M, in some embodiments reactivity in the central core region may be controlled at a block 134.

Figure 8N:
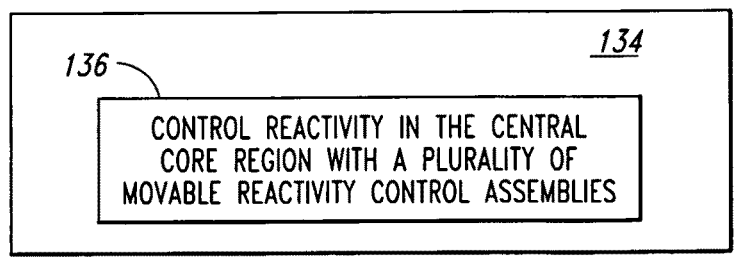

Referring to FIG. 8N, in some embodiments controlling reactivity in the central core region at the block 134 may include controlling reactivity in the central core region with a plurality of movable reactivity control assemblies at a block 136.

Figure 8O:
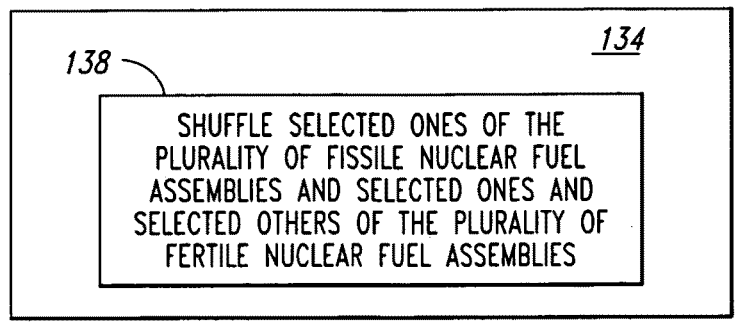

Referring to FIG. 8O, in some embodiments controlling reactivity in the central core region at the block 134 may include shuffling selected ones of the plurality of fissile nuclear fuel assemblies and selected ones and selected others of the plurality of fertile nuclear fuel assemblies at a block 138.

Figure 8P:
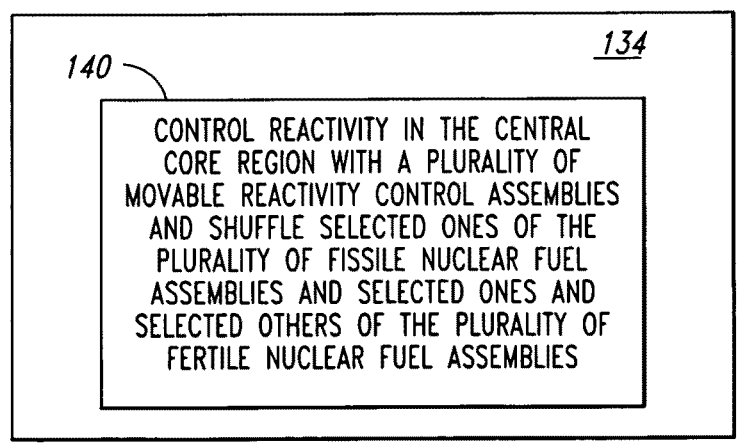

Referring to FIG. 8P, in some embodiments controlling reactivity in the central core region at the block 134 may include controlling reactivity in the central core region with a plurality of movable reactivity control assemblies and shuffling selected ones of the plurality of fissile nuclear fuel assemblies and selected ones and selected others of the plurality of fertile nuclear fuel assemblies at a block 140.

Figure 8Q:
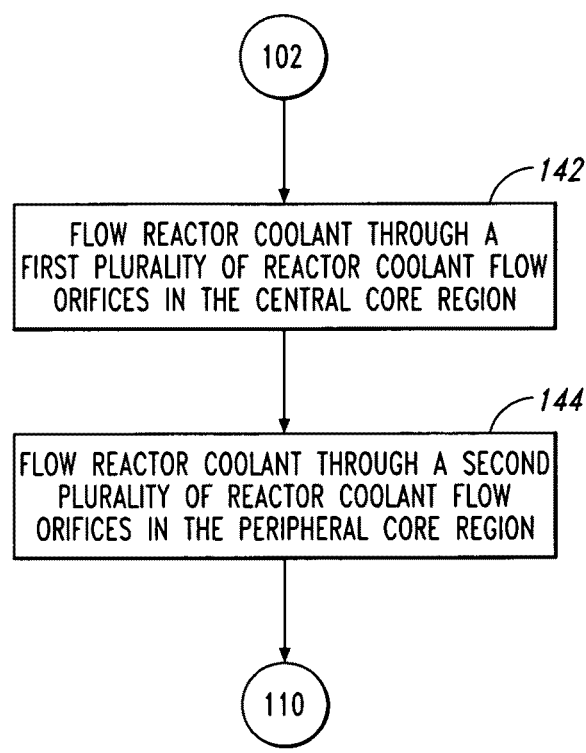

Referring to FIG. 8Q, in some embodiments reactor coolant may be flowed through a first plurality of reactor coolant flow orifices in the central core region at a block 142 and reactor coolant may be flowed through a second plurality of reactor coolant flow orifices in the peripheral core region at a block 144.

Figure 8R:
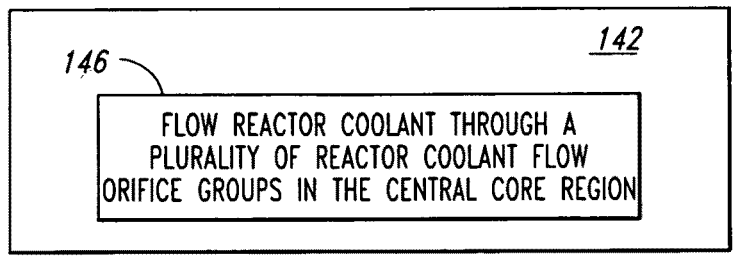

Referring to FIG. 8R, in some embodiments flowing reactor coolant through a first plurality of reactor coolant flow orifices in the central core region at the block 142 may include flowing reactor coolant through a plurality of reactor coolant flow orifice groups in the central core region at a block 146. In some embodiments, flow rate through a selected one of the plurality of reactor coolant flow orifice groups may be based upon a power profile at a radial location of the selected one of the plurality of reactor coolant flow orifice groups. In some embodiments, flow rate through the second plurality of reactor coolant flow orifices may include a predetermined flow rate based upon power level in the peripheral core region.

Figure 8S:
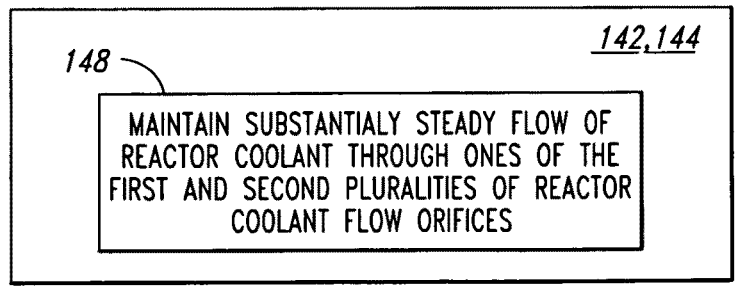

Referring to FIG. 8S, in some embodiments flowing reactor coolant through a first plurality of reactor coolant flow orifices in the central core region at the block 142 and flowing reactor coolant through a second plurality of reactor coolant flow orifices in the peripheral core region at the block 144 may include maintaining substantially steady flow of reactor coolant through ones of the first and second pluralities of reactor coolant flow orifices at a block 148.

Figure 8T:
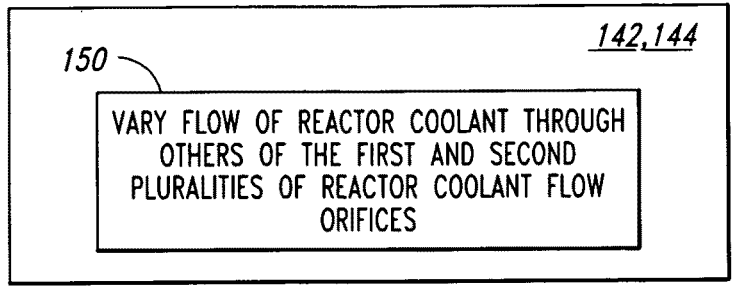

Referring to FIG. 8T, in some embodiments flowing reactor coolant through a first plurality of reactor coolant flow orifices in the central core region at the block 142 and flowing reactor coolant through a second plurality of reactor coolant flow orifices in the peripheral core region at the block 144 may include varying flow of reactor coolant through others of the first and second pluralities of reactor coolant flow orifices at a block 150.

Figure 8U:
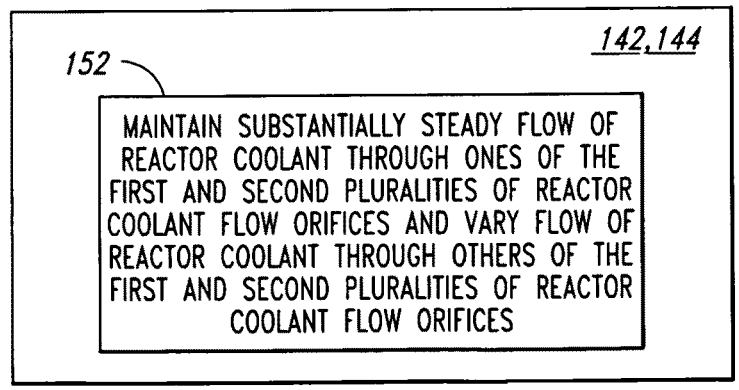

Referring to FIG. 8U, in some embodiments flowing reactor coolant through a first plurality of reactor coolant flow orifices in the central core region at the block 142 and flowing reactor coolant through a second plurality of reactor coolant flow orifices in the peripheral core region at the block 144 may include maintaining substantially steady flow of reactor coolant through ones of the first and second pluralities of reactor coolant flow orifices and varying flow of reactor coolant through others of the first and second pluralities of reactor coolant flow orifices at a block 152.

Figure 8V:
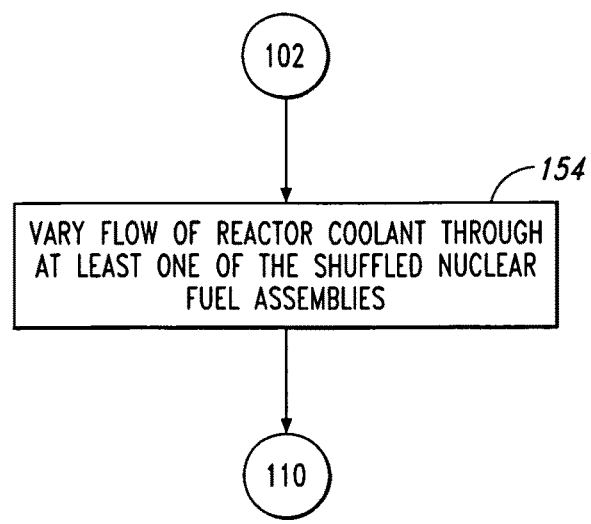

Referring to FIG. 8V, in some embodiments flow of reactor coolant may be varied through at least one of the shuffled nuclear fuel assemblies at a block 154.

Figure 8W:
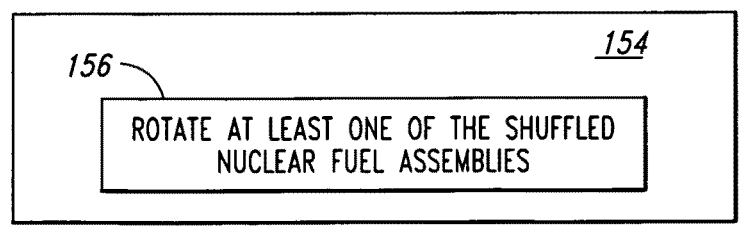

Referring to FIG. 8W, in some embodiments varying flow of reactor coolant through at least one of the shuffled nuclear fuel assemblies at the block 154 may include rotating at least one of the shuffled nuclear fuel assemblies at a block 156.

Figure 8X:
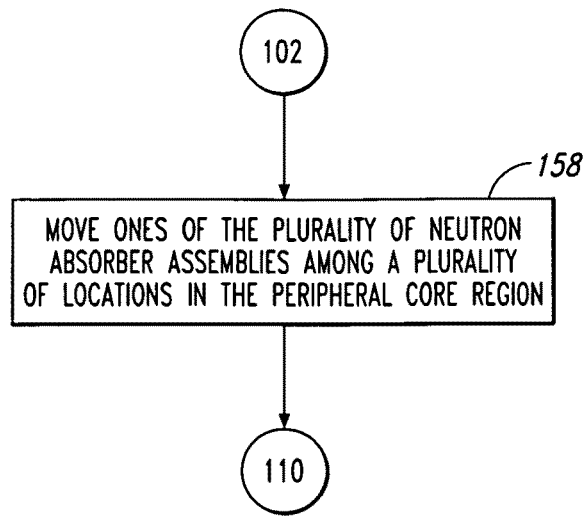

Referring to FIG. 8X, in some embodiments ones of the plurality of neutron absorber assemblies may be moved among a plurality of locations in the peripheral core region at a block 158. In some embodiments, the plurality of locations in the peripheral core region may include a plurality of predetermined radial locations in the peripheral core region that are selectable based upon a predetermined burnup level of ones of the fissile nuclear fuel assemblies that have been shuffled into the peripheral core region.

Figure 8Y:
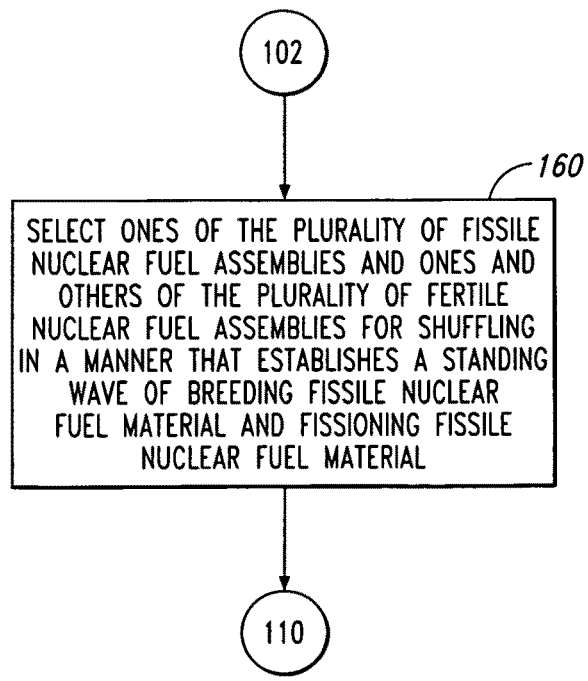

Referring to FIG. 8Y, in some embodiments at a block 160 ones of the plurality of fissile nuclear fuel assemblies and ones and others of the plurality of fertile nuclear fuel assemblies may be selected for shuffling in a manner that establishes a standing wave of breeding fissile nuclear fuel material and fissioning fissile nuclear fuel material. In some embodiments selecting ones of the plurality of fissile nuclear fuel assemblies and ones and others of the plurality of fertile nuclear fuel assemblies for shuffling in a manner that establishes a standing wave of breeding fissile nuclear fuel material and fissioning fissile nuclear fuel material may be based upon at least one operational datum chosen from neutron flux data, fuel assembly outlet temperature, and fuel assembly flow rate.

Figure 9A:
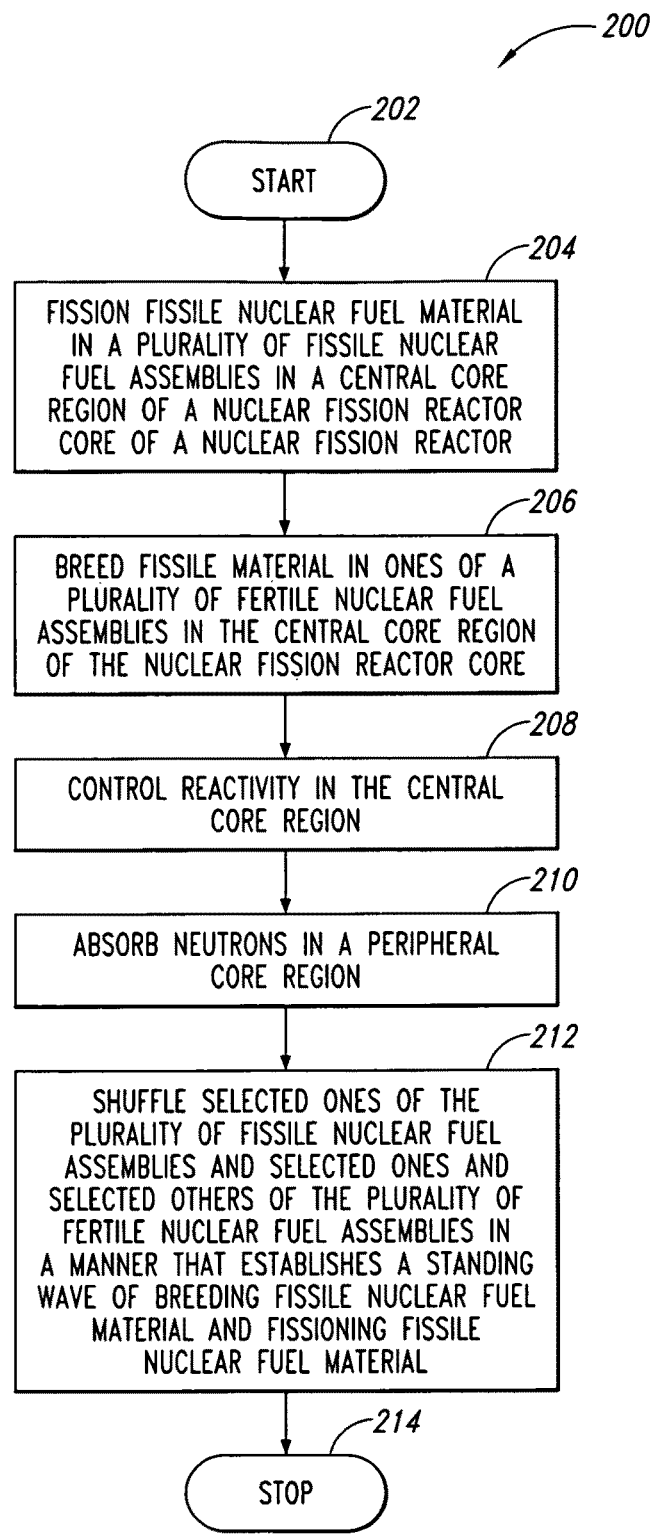
FIG. 9A is a flowchart of another illustrative method of operating a nuclear fission reactor.

Given by way of overview and referring now to FIG. 9A, a method 200 is provided for operating a nuclear fission reactor. The method 200 starts at a block 202. At a block 204 fissile nuclear fuel material is fissioned in a plurality of fissile nuclear fuel assemblies in a central core region of a nuclear fission reactor core of a nuclear fission reactor. At a block 206 fissile material is bred in ones of a plurality of fertile nuclear fuel assemblies in the central core region of the nuclear fission reactor core. At a block 208 reactivity in the central core region is controlled. At a block 210 neutrons are absorbed in a peripheral core region. At a block 212 selected ones of the plurality of fissile nuclear fuel assemblies and selected ones and selected others of the plurality of fertile nuclear fuel assemblies are shuffled in a manner that establishes a standing wave of breeding fissile nuclear fuel material and fissioning fissile nuclear fuel material. The method 200 stops at a block 214. Details will be set forth below by way of non-limiting examples.

Figure 9B:
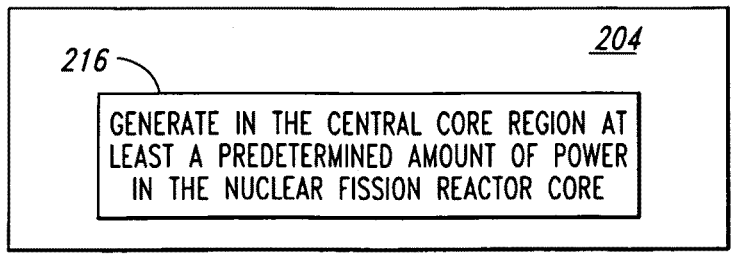
FIGS. 9B-9W are flowcharts of illustrative details of the method of FIG. 9A.

Referring to FIG. 9B, in some embodiments fissioning fissile nuclear fuel material in a plurality of fissile nuclear fuel assemblies in a central core region of a nuclear fission reactor core of a nuclear fission reactor at the block 204 may include generating in the central core region at least a predetermined amount of power in the nuclear fission reactor core at a block 216.

Figure 9C:
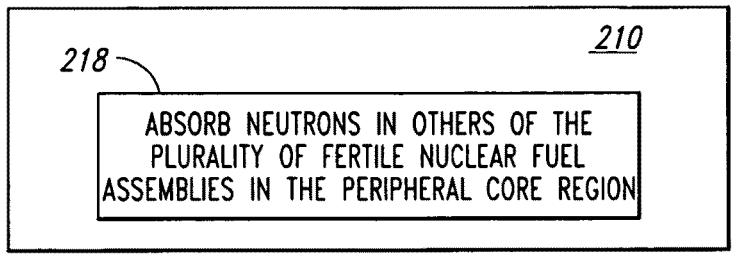

Referring to FIG. 9C, in some embodiments absorbing neutrons in a peripheral core region at the block 210 may include absorbing neutrons in others of the plurality of fertile nuclear fuel assemblies in the peripheral core region at a block 218.

Figure 9D:
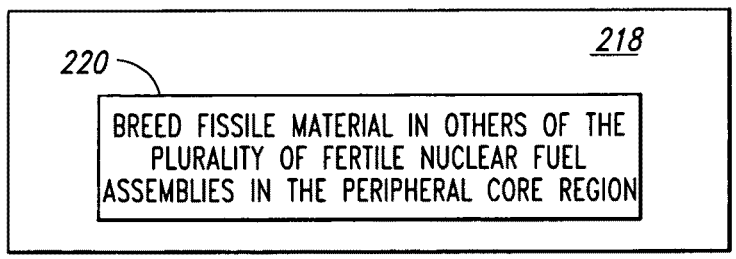

Referring to FIG. 9D, in some embodiments absorbing neutrons in others of the plurality of fertile nuclear fuel assemblies in the peripheral core region at the block 218 may include breeding fissile material in others of the plurality of fertile nuclear fuel assemblies in the peripheral core region at a block 220.

Figure 9E:
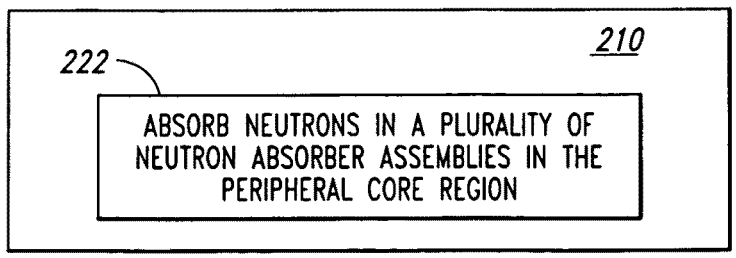

Referring to FIG. 9E, in some embodiments absorbing neutrons in a peripheral core region at the block 210 may include absorbing neutrons in a plurality of neutron absorber assemblies in the peripheral core region at a block 222.

Figure 9F:
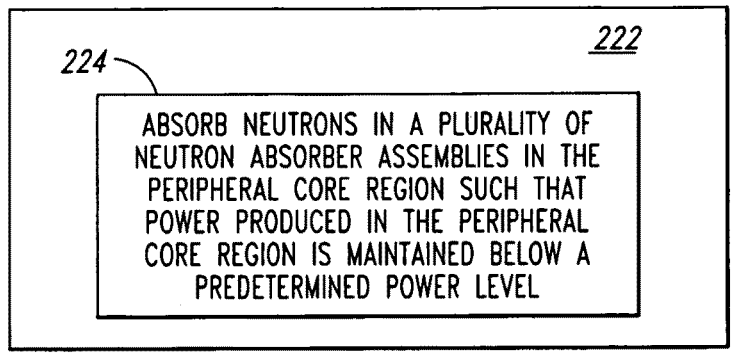

Referring to FIG. 9F, in some embodiments absorbing neutrons in a plurality of neutron absorber assemblies in the peripheral core region at the block 222 may include absorbing neutrons in a plurality of neutron absorber assemblies in the peripheral core region such that power produced in the peripheral core region is maintained below a predetermined power level at a block 224.

Figure 9G:
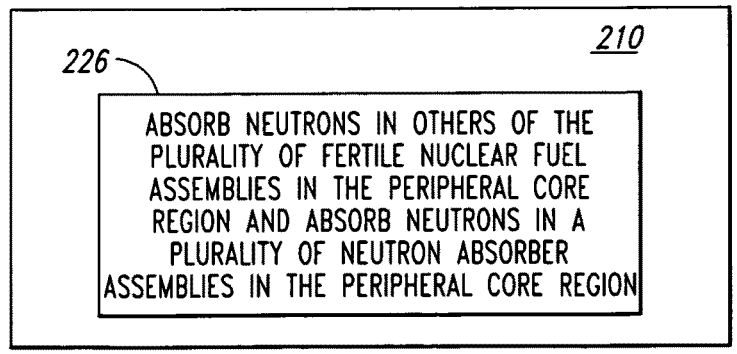

Referring to FIG. 9G, in some embodiments absorbing neutrons in a peripheral core region at the block 210 may include absorbing neutrons in others of the plurality of fertile nuclear fuel assemblies in the peripheral core region and absorbing neutrons in a plurality of neutron absorber assemblies in the peripheral core region at a block 226.

Figure 9H:
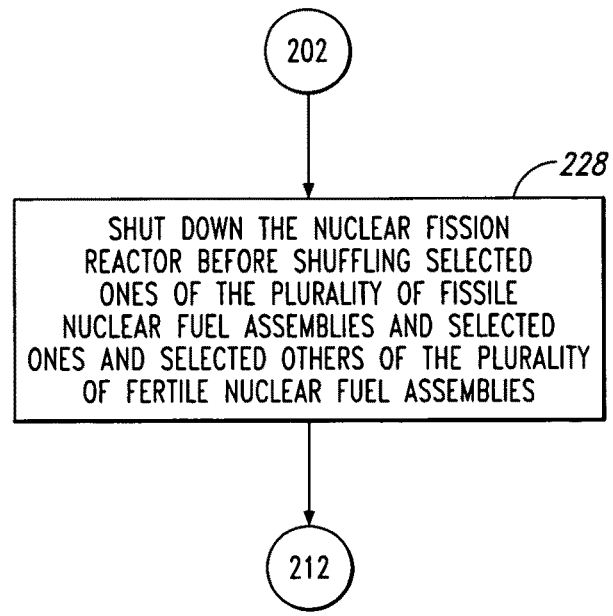

Referring to FIG. 9H, in some embodiments at a block 228 the nuclear fission reactor may be shut down before shuffling selected ones of the plurality of fissile nuclear fuel assemblies and selected ones and selected others of the plurality of fertile nuclear fuel assemblies between the central core region and the peripheral core region.

Figure 9I:
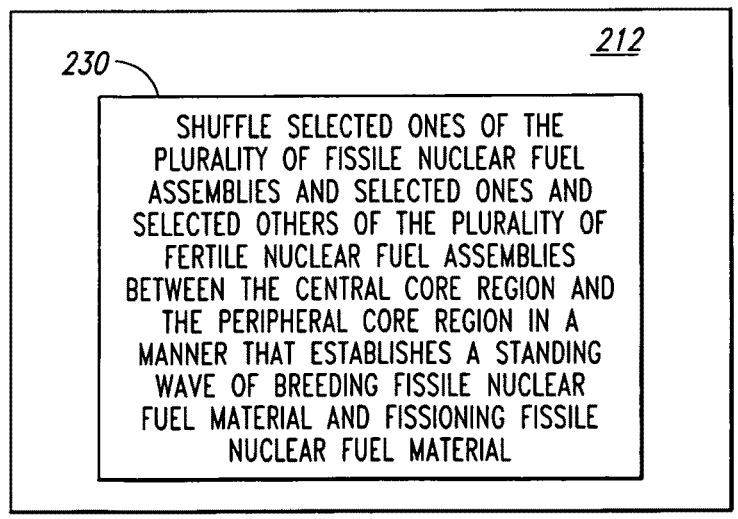

Referring to FIG. 9I, in some embodiments shuffling selected ones of the plurality of fissile nuclear fuel assemblies and selected ones and selected others of the plurality of fertile nuclear fuel assemblies in a manner that establishes a standing wave of breeding fissile nuclear fuel material and fissioning fissile nuclear fuel material at the block 212 may include shuffling selected ones of the plurality of fissile nuclear fuel assemblies and selected ones and selected others of the plurality of fertile nuclear fuel assemblies between the central core region and the peripheral core region in a manner that establishes a standing wave of breeding fissile nuclear fuel material and fissioning fissile nuclear fuel material at a block 230.

Figure 9J:
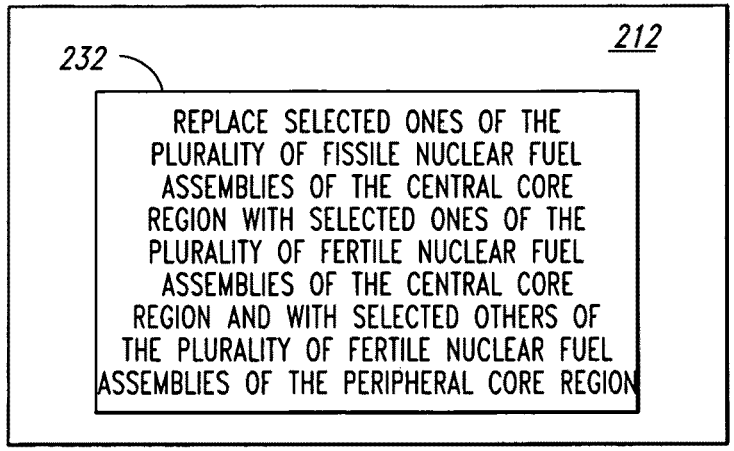

Referring to FIG. 9J, in some embodiments shuffling selected ones of the plurality of fissile nuclear fuel assemblies and selected ones and selected others of the plurality of fertile nuclear fuel assemblies at the block 212 may include replacing selected ones of the plurality of fissile nuclear fuel assemblies of the central core region with selected ones of the plurality of fertile nuclear fuel assemblies of the central core region and with selected others of the plurality of fertile nuclear fuel assemblies of the peripheral core region at a block 232.

Figure 9K:
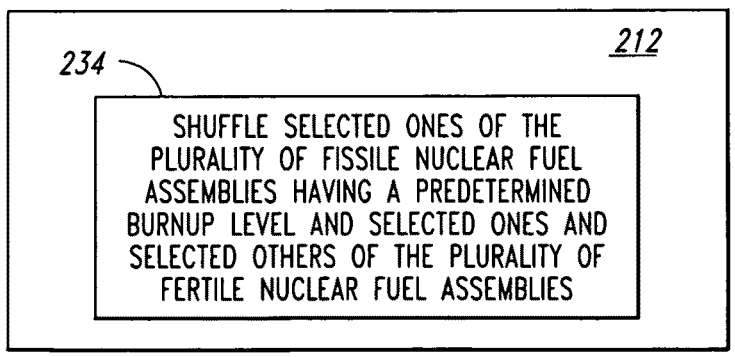

Referring to FIG. 9K, in some embodiments shuffling selected ones of the plurality of fissile nuclear fuel assemblies and selected ones and selected others of the plurality of fertile nuclear fuel assemblies at the block 212 may include shuffling selected ones of the plurality of fissile nuclear fuel assemblies having a predetermined burnup level and selected ones and selected others of the plurality of fertile nuclear fuel assemblies at a block 234.

Figure 9L:
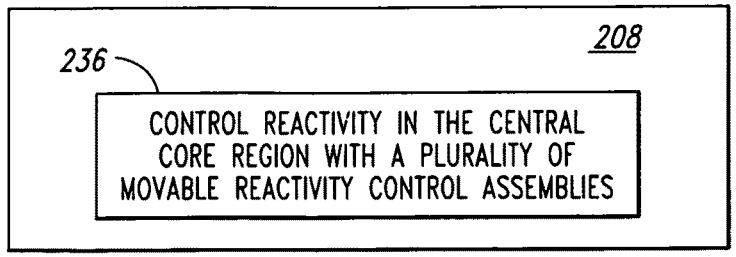

Referring to FIG. 9L, in some embodiments controlling reactivity in the central core region at the block 208 may include controlling reactivity in the central core region with a plurality of movable reactivity control assemblies at a block 236.

Figure 9M:
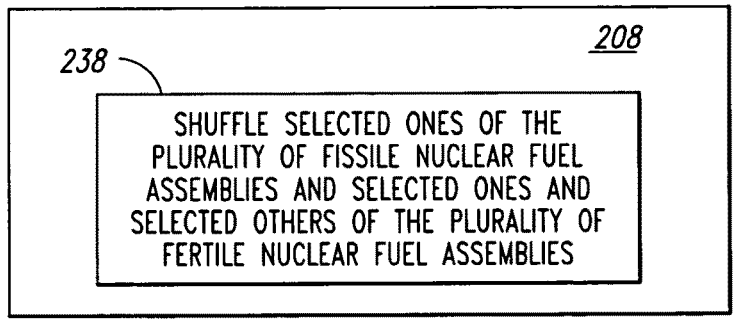

Referring to FIG. 9M, in some embodiments controlling reactivity in the central core region at the block 208 may include shuffling selected ones of the plurality of fissile nuclear fuel assemblies and selected ones and selected others of the plurality of fertile nuclear fuel assemblies at a block 238.

Figure 9N:
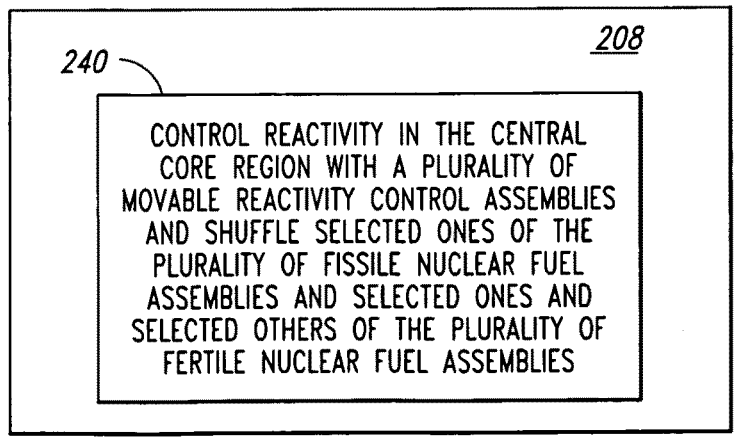
Figure 90:
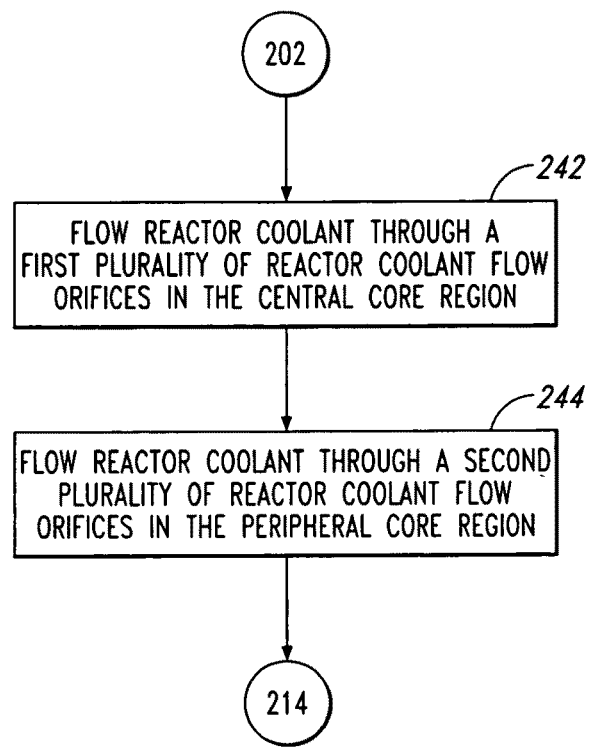

Referring to FIG. 9N, in some embodiments controlling reactivity in the central core region at the block 208 may include controlling reactivity in the central core region with a plurality of movable reactivity control assemblies and shuffling selected ones of the plurality of fissile nuclear fuel assemblies and selected ones and selected others of the plurality of fertile nuclear fuel assemblies at a block 240.

Referring to FIG. 9O, in some embodiments reactor coolant may be flowed through a first plurality of reactor coolant flow orifices in the central core region at a block 242 and reactor coolant may be flowed through a second plurality of reactor coolant flow orifices in the peripheral core region at a block 244.

Figure 9P:
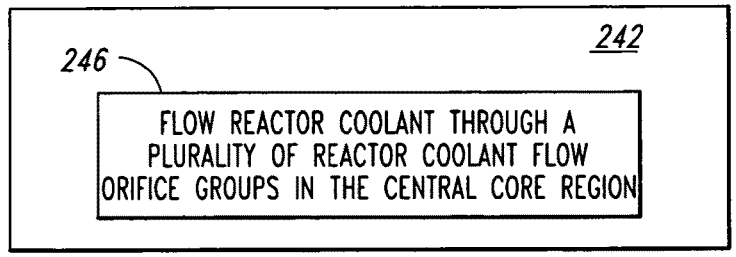

Referring to FIG. 9P, in some embodiments flowing reactor coolant through a first plurality of reactor coolant flow orifices in the central core region at the block 242 may include flowing reactor coolant through a plurality of reactor coolant flow orifice groups in the central core region at a block 246. In some embodiments flow rate through a selected one of the plurality of reactor coolant flow orifice groups may be based upon a power profile at a radial location of the selected one of the plurality of reactor coolant flow orifice groups. In some embodiments flow rate through the second plurality of reactor coolant flow orifices may include a predetermined flow rate based upon power level in the peripheral core region.

Figure 9Q:
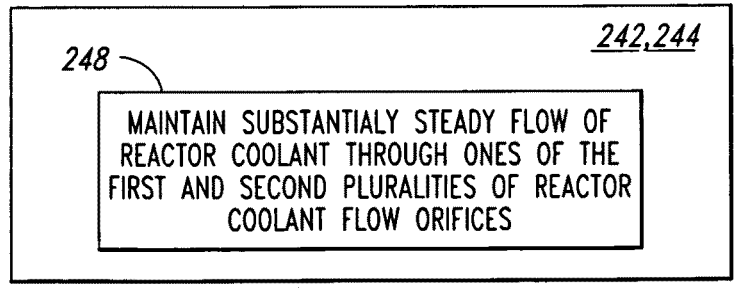

Referring to FIG. 9Q, in some embodiments flowing reactor coolant through a first plurality of reactor coolant flow orifices in the central core region at the block 242 and flowing reactor coolant through a second plurality of reactor coolant flow orifices in the peripheral core region at the block 244 may include maintaining substantially steady flow of reactor coolant through ones of the first and second pluralities of reactor coolant flow orifices at a block 248.

Figure 9R:
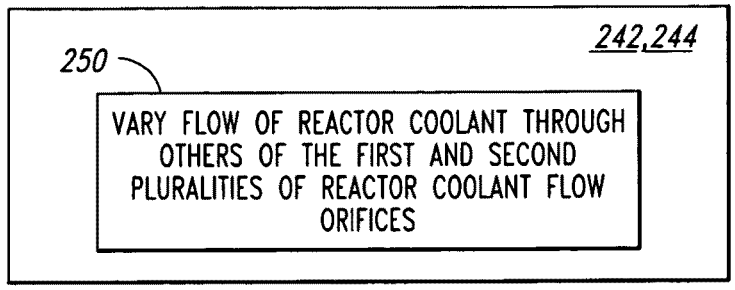

Referring to FIG. 9R, in some embodiments flowing reactor coolant through a first plurality of reactor coolant flow orifices in the central core region at the block 242 and flowing reactor coolant through a second plurality of reactor coolant flow orifices in the peripheral core region at the block 244 may include varying flow of reactor coolant through others of the first and second pluralities of reactor coolant flow orifices at a block 250.

Figure 9S:
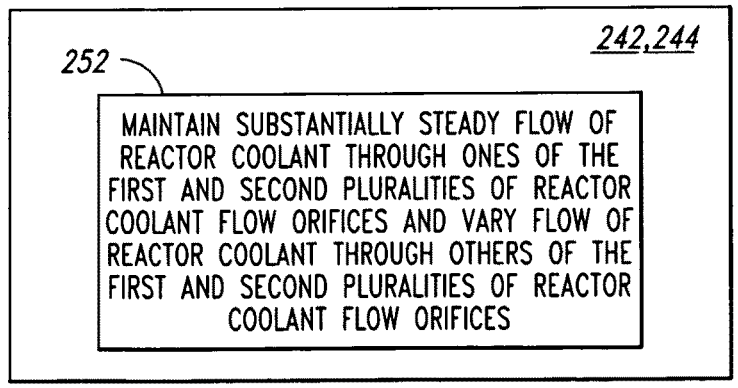

Referring to FIG. 9S, in some embodiments flowing reactor coolant through a first plurality of reactor coolant flow orifices in the central core region at the block 242 and flowing reactor coolant through a second plurality of reactor coolant flow orifices in the peripheral core region at the block 244 may include maintaining substantially steady flow of reactor coolant through ones of the first and second pluralities of reactor coolant flow orifices and varying flow of reactor coolant through others of the first and second pluralities of reactor coolant flow orifices at a block 252.

Figure 9T:
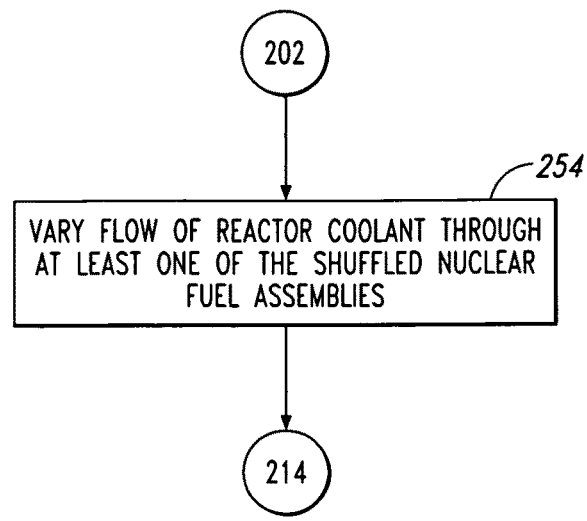

Referring to FIG. 9T, in some embodiments flow of reactor coolant through at least one of the shuffled nuclear fuel assemblies may be varied at a block 254.

Figure 9U:
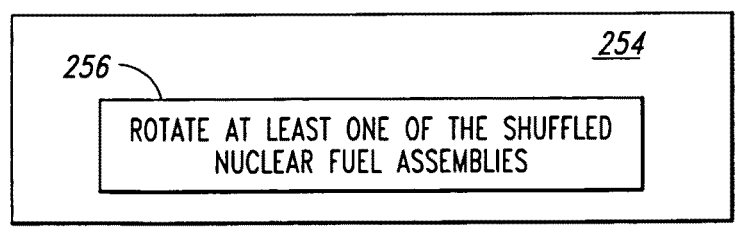

Referring to FIG. 9U, in some embodiments varying flow of reactor coolant through at least one of the shuffled nuclear fuel assemblies at the block 254 may include rotating at least one of the shuffled nuclear fuel assemblies at a block 256.

Figure 9V:
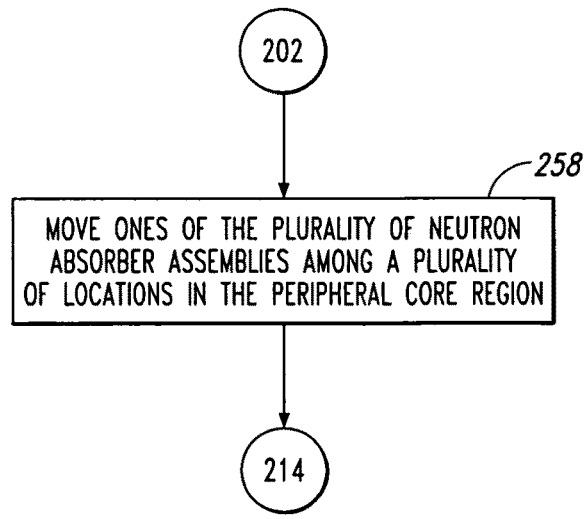

Referring to FIG. 9V, in some embodiments ones of the plurality of neutron absorber assemblies may be moved among a plurality of locations in the peripheral core region at a block 258. In some embodiments the plurality of locations in the peripheral core region may include a plurality of predetermined radial locations in the peripheral core region that are selectable based upon a predetermined burnup level of ones of the fissile nuclear fuel assemblies that have been shuffled into the peripheral core region.

Figure 9W:
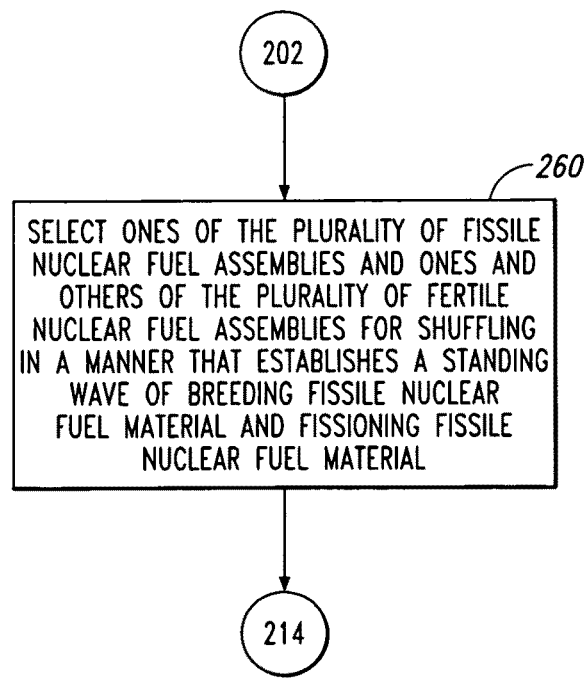

Referring to FIG. 9W, in some embodiments at a block 260 ones of the plurality of fissile nuclear fuel assemblies and ones and others of the plurality of fertile nuclear fuel assemblies may be selected for shuffling in a manner that establishes a standing wave of breeding fissile nuclear fuel material and fissioning fissile nuclear fuel material. In some embodiments selecting ones of the plurality of fissile nuclear fuel assemblies and ones and others of the plurality of fertile nuclear fuel assemblies for shuffling in a manner that establishes a standing wave of breeding fissile nuclear fuel material and fissioning fissile nuclear fuel material may be based upon at least one operational datum chosen from neutron flux data, fuel assembly outlet temperature, and fuel assembly flow rate.

Figure 10A:
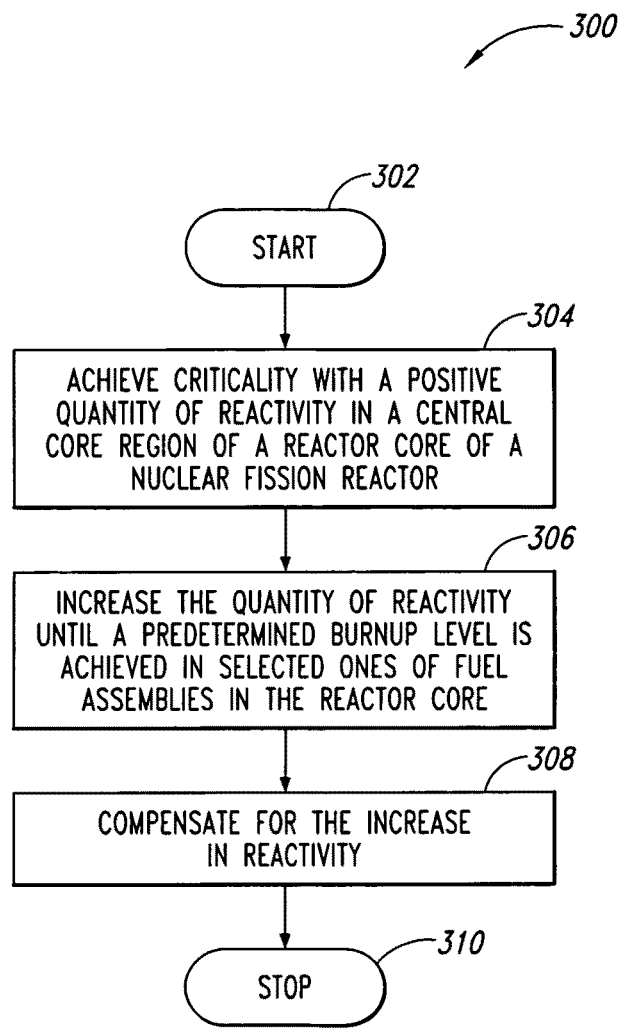
FIG. 10A is a flowchart of an illustrative method of managing excess reactivity in a nuclear fission reactor.

Given by way of overview and referring now to FIG. 10A, a method 300 is provided for managing excess reactivity in a nuclear fission reactor. The method 300 starts at a block 302. At a block 304, criticality with a positive quantity of reactivity is achieved in a central core region of a reactor core of a nuclear fission reactor. At a block 306 the quantity of reactivity is increased until a predetermined burnup level is achieved in selected ones of fuel assemblies in the reactor core. At a block 308 the increase in reactivity is compensated for. The method 300 stops at a block 310. Details will be set forth below by way of non-limiting examples.

Figure 10B:
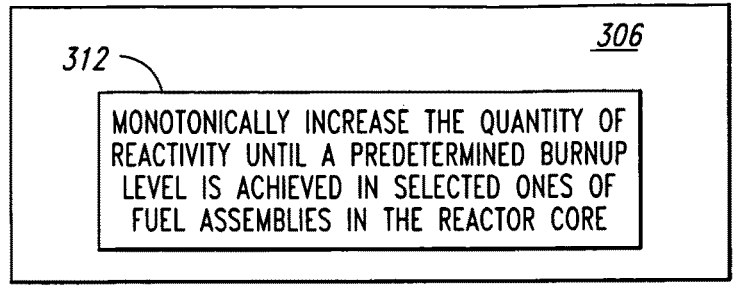
FIGS. 10B-10H are flowcharts of illustrative details of the method of FIG. 10A.

Referring to FIG. 10B, in some embodiments increasing the quantity of reactivity until a predetermined burnup level is achieved in selected ones of fuel assemblies in the reactor core at the block 306 may include monotonically increasing the quantity of reactivity until a predetermined burnup level is achieved in selected ones of fuel assemblies in the reactor core at a block 312.

Figure 10C:
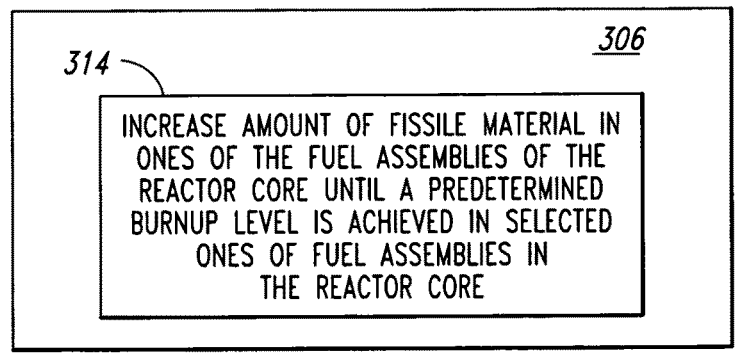

Referring to FIG. 10C, in some embodiments increasing the quantity of reactivity until a predetermined burnup level is achieved in selected ones of fuel assemblies in the reactor core at the block 306 may include increasing amount of fissile material in ones of the fuel assemblies of the reactor core until a predetermined burnup level is achieved in selected ones of fuel assemblies in the reactor core at a block 314.

Figure 10D:
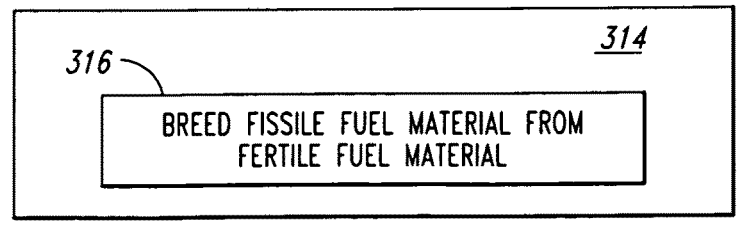

Referring to FIG. 10D, in some embodiments increasing amount of fissile material in ones of the fuel assemblies of the reactor core until a predetermined burnup level is achieved in selected ones of fuel assemblies in the reactor core at the block 314 may include breeding fissile fuel material from fertile fuel material at a block 316.

Figure 10E:
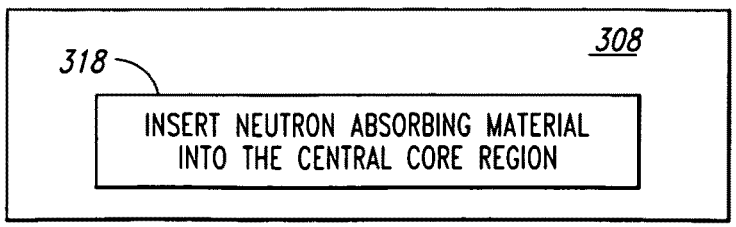

Referring to FIG. 10E, in some embodiments compensating for the increase in reactivity at the block 308 may include inserting neutron absorbing material into the central core region at a block 318.

Figure 10F:
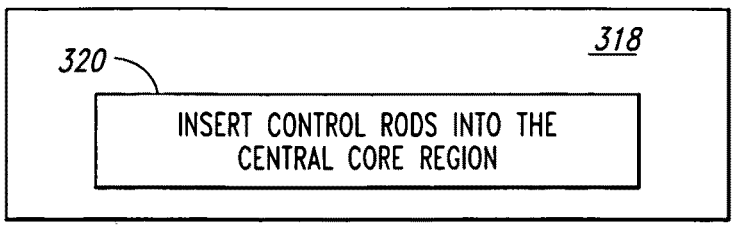

Referring to FIG. 10F, in some embodiments inserting neutron absorbing material into the central core region at the block 318 may include inserting control rods into the central core region at a block 320.

Figure 10G:
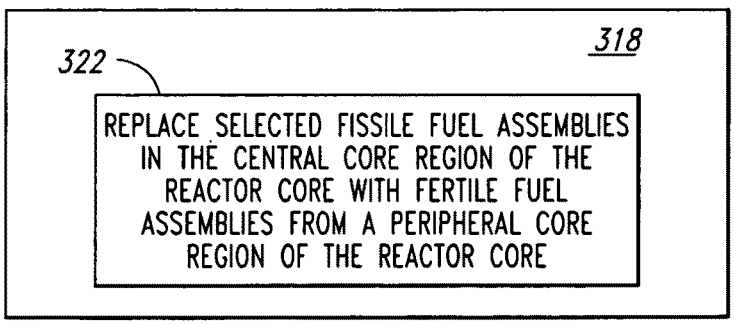

Referring to FIG. 10G, in some embodiments inserting neutron absorbing material into the central core region at the block 318 may include replacing selected fissile fuel assemblies in the central core region with fertile fuel assemblies from a peripheral core region of the reactor core at a block 322.

Figure 10H:
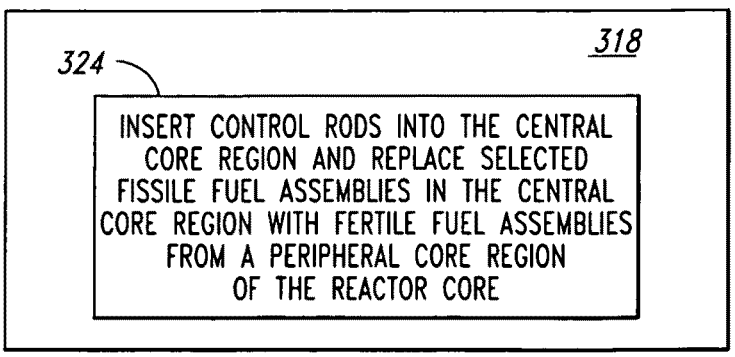

Referring to FIG. 10H, in some embodiments inserting neutron absorbing material into the central core region at the block 318 may include inserting control rods into the central core region and replacing selected fissile fuel assemblies in the central core region with fertile fuel assemblies from a peripheral core region of the reactor core at a block 324.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A nuclear fission reactor comprising:
a reactor vessel;
a nuclear fission reactor core disposed in the reactor vessel, the nuclear fission reactor core including:
a central core region including:
a plurality of fissile nuclear fuel assemblies;
ones of a plurality of fertile nuclear fuel assemblies; and
a plurality of movable reactivity control assemblies; and
a peripheral core region located radially outward from the central core region and radially inward of a radial shield of the core, the peripheral core region including:
others of the plurality of fertile nuclear fuel assemblies; and
a plurality of neutron absorber assemblies disposed among the others of the plurality of fertile nuclear fuel assemblies in the peripheral core region, locations of the plurality of neutron absorber assemblies selected from predetermined radial locations in the peripheral core region based upon a predetermined stage of core life of the others of the plurality of fertile nuclear fuel assemblies and any other nuclear fuel assemblies of the peripheral core region;
an in-vessel handling system configured to shuffle ones of the plurality of fissile nuclear fuel assemblies and ones of the plurality of fertile nuclear fuel assemblies; and
a reactor coolant system.

2. The nuclear fission reactor of claim 1, wherein the in-vessel handling system is further configured to shuffle ones of the plurality of fissile nuclear fuel assemblies and ones of the plurality of fertile nuclear fuel assemblies between the central core region and the peripheral core region.

3. The nuclear fission reactor of claim 1, wherein the plurality of fissile nuclear fuel assemblies includes:
a plurality of enriched fissile nuclear fuel assemblies; and
a plurality of bred fissile nuclear fuel assemblies.

4. The nuclear fission reactor of claim 3, wherein the peripheral core region further includes ones of the plurality of bred fissile nuclear fuel assemblies.

5. The nuclear fission reactor of claim 3, wherein the peripheral core region further includes selected ones of the plurality of enriched fissile nuclear fuel assemblies having at least a predetermined burnup level.

6. The nuclear fission reactor of claim 3, wherein the peripheral core region further includes selected ones of the plurality of bred fissile nuclear fuel assemblies having at least a predetermined burnup level.

7. The nuclear fission reactor of claim 3, wherein the peripheral core region further includes ones of the plurality of bred fissile nuclear fuel assemblies having less than a predetermined burnup level.

8. The nuclear fission reactor of claim 1, wherein:
the plurality of fissile nuclear fuel assemblies includes a plurality of bred fissile nuclear fuel assemblies; and
the core peripheral region includes a plurality of enriched fissile nuclear fuel assemblies having at least a predetermined burnup level.

9. The nuclear fission reactor of claim 8, wherein the peripheral core region further includes ones of the plurality of bred fissile nuclear fuel assemblies.

10. The nuclear fission reactor of claim 9, wherein the peripheral core region further includes selected ones of the plurality of bred fissile nuclear fuel assemblies having at least a predetermined burnup level.

11. The nuclear fission reactor of claim 9, wherein the peripheral core region further includes ones of the plurality of bred fissile nuclear fuel assemblies having less than a predetermined burnup level.

12. The nuclear fission reactor of claim 1, wherein at least one of the plurality of fissile nuclear fuel assemblies includes fissile material discharged from a nuclear fission reactor.

13. The nuclear fission reactor of claim 12, wherein the plurality of fissile nuclear fuel assemblies that includes fissile material discharged from a nuclear fission reactor includes at least one re-clad fissile fuel assembly.

14. The nuclear fission reactor of claim 1, further comprising a plurality of fuel assembly flow receptacles defining:
a first plurality of reactor coolant flow orifices in the central core region; and
a second plurality of reactor coolant flow orifices in the peripheral core region.

15. The nuclear fission reactor of claim 14, wherein the first plurality of reactor coolant flow orifices includes a plurality of reactor coolant flow orifice groups.

16. The nuclear fission reactor of claim 15, wherein flow rate through a selected one of the plurality of reactor coolant flow orifice groups is based upon a power profile at a radial location of the selected one of the plurality of reactor coolant flow orifice groups.

17. The nuclear fission reactor of claim 14, wherein flow rate through the second plurality of reactor coolant flow orifices includes a predetermined flow rate based upon power level in the peripheral core region.

18. The nuclear fission reactor of claim 14, wherein the first and second pluralities of reactor coolant flow orifices include fixed orifices.

19. The nuclear fission reactor of claim 14, wherein the first and second pluralities of reactor coolant flow orifices include variable orifices.

20. The nuclear fission reactor of claim 14, wherein the first and second pluralities of reactor coolant flow orifices include fixed orifices and variable orifices.

21. The nuclear fission reactor of claim 1, wherein the in-vessel handling system is further configured to move ones of the plurality of neutron absorber assemblies among a plurality of locations in the peripheral core region.

22. The nuclear fission reactor of claim 21, wherein the plurality of locations in the peripheral core region include a plurality of predetermined radial locations in the peripheral core region that are selectable based upon a predetermined burnup level of nuclear fuel assemblies located in the peripheral core region.

23. The nuclear fission reactor of claim 1, wherein the in-vessel handling system is further configured to rotate ones of the plurality of neutron absorber assemblies.

24. The nuclear fission reactor of claim 1, wherein the in-vessel handling system is further configured to shuffle ones of the plurality of fissile nuclear fuel assemblies and ones of the plurality of fertile nuclear fuel assemblies between the central core region and a portion of the reactor vessel exterior the nuclear fission reactor core.

25. The nuclear fission reactor of claim 1, wherein the reactor coolant system includes a pool of liquid sodium disposed in the reactor vessel, the nuclear fission reactor core being submerged in the pool of liquid sodium.

26. The nuclear fission reactor of claim 1, wherein the neutron absorber assemblies are surrounded by the fertile fuel assemblies of the peripheral core region and inside the radial shield.

27. The nuclear fission reactor of claim 1, wherein at least a portion of the neutron absorber assemblies within the peripheral core region are not movable.

28. The nuclear fission reactor of claim 1, wherein at a beginning of life BoL of the nuclear fission reactor core, the peripheral core region includes no fissile nuclear fuel assemblies.

29. A nuclear fission reactor comprising:
a reactor vessel;
a nuclear fission reactor core disposed in the reactor vessel, the nuclear fission reactor core including:
a central core region including:
a plurality of fissile nuclear fuel assemblies;
ones of a plurality of fertile nuclear fuel assemblies; and
a plurality of movable reactivity control assemblies; and
a peripheral core region located radially outward from the central core region and radially inward of a radial shield of the core, the peripheral core region including:
others of the plurality of fertile nuclear fuel assemblies; and
a plurality of neutron absorber assemblies disposed among the others of the plurality of fertile nuclear fuel assemblies in the peripheral core region, locations of the plurality of neutron absorber assemblies selected from predetermined radial locations in the peripheral core region based upon a predetermined stage of core life of the others of the plurality of fertile nuclear fuel assemblies and any other nuclear fuel assemblies of the peripheral core region;
an in-vessel handling system configured to shuffle ones of the plurality of fissile nuclear fuel assemblies and ones of the plurality of fertile nuclear fuel assemblies;
a reactor coolant system;
a plurality of fuel assembly flow receptacles defining:
a first plurality of reactor coolant flow orifices in the central core region; and
a second plurality of reactor coolant flow orifices in the peripheral core region; and
a decay heat removal system.

30. The nuclear fission reactor of claim 29, wherein the in-vessel handling system is further configured to shuffle ones of the plurality of fissile nuclear fuel assemblies and ones of the plurality of fertile nuclear fuel assemblies between the central core region and the peripheral core region.

31. The nuclear fission reactor of claim 29, wherein the plurality of fissile nuclear fuel assemblies includes:
a plurality of enriched fissile nuclear fuel assemblies; and
a plurality of bred fissile nuclear fuel assemblies.

32. The nuclear fission reactor of claim 31, wherein the peripheral core region further includes ones of the plurality of bred fissile nuclear fuel assemblies.

33. The nuclear fission reactor of claim 31, wherein the peripheral core region further includes selected ones of the plurality of enriched fissile nuclear fuel assemblies having at least a predetermined burnup level.

34. The nuclear fission reactor of claim 31, wherein the peripheral core region further includes selected ones of the plurality of bred fissile nuclear fuel assemblies having at least a predetermined burnup level.

35. The nuclear fission reactor of claim 31, wherein the peripheral core region further includes ones of the plurality of bred fissile nuclear fuel assemblies having less than a predetermined burnup level.

36. The nuclear fission reactor of claim 29, wherein:
the plurality of fissile nuclear fuel assemblies includes a plurality of bred fissile nuclear fuel assemblies; and
the core peripheral region includes a plurality of enriched fissile nuclear fuel assemblies having at least a predetermined burnup level.

37. The nuclear fission reactor of claim 36, wherein the peripheral core region further includes ones of the plurality of bred fissile nuclear fuel assemblies.

38. The nuclear fission reactor of claim 37, wherein the peripheral core region further includes selected ones of the plurality of bred fissile nuclear fuel assemblies having at least a predetermined burnup level.

39. The nuclear fission reactor of claim 37, wherein the peripheral core region further includes ones of the plurality of bred fissile nuclear fuel assemblies having less than a predetermined burnup level.

40. The nuclear fission reactor of claim 29, wherein at least one of the plurality of fissile nuclear fuel assemblies includes fissile material discharged from a nuclear fission reactor.

41. The nuclear fission reactor of claim 40, wherein the plurality of fissile nuclear fuel assemblies that includes fissile material discharged from a nuclear fission reactor includes at least one re-clad fissile fuel assembly.

42. The nuclear fission reactor of claim 29, wherein the first plurality of reactor coolant flow orifices includes a plurality of reactor coolant flow orifice groups.

43. The nuclear fission reactor of claim 42, wherein flow rate through a selected one of the plurality of reactor coolant flow orifice groups is based upon a power profile at a radial location of the selected one of the plurality of reactor coolant flow orifice groups.

44. The nuclear fission reactor of claim 29, wherein flow rate through the second plurality of reactor coolant flow orifices includes a predetermined flow rate based upon power level in the peripheral core region.

45. The nuclear fission reactor of claim 29, wherein the first and second pluralities of reactor coolant flow orifices include fixed orifices.

46. The nuclear fission reactor of claim 29, wherein the first and second pluralities of reactor coolant flow orifices include variable orifices.

47. The nuclear fission reactor of claim 29, wherein the first and second pluralities of reactor coolant flow orifices include fixed orifices and variable orifices.

48. The nuclear fission reactor of claim 29, wherein the in-vessel handling system is further configured to move ones of the plurality of neutron absorber assemblies among a plurality of locations in the peripheral core region.

49. The nuclear fission reactor of claim 48, wherein the plurality of locations in the peripheral core region include a plurality of predetermined radial locations in the peripheral core region that are selectable based upon a predetermined burnup level of nuclear fuel assemblies located in the peripheral core region.

50. The nuclear fission reactor of claim 29, wherein the in-vessel handling system is further configured to rotate ones of the plurality of neutron absorber assemblies.

51. The nuclear fission reactor of claim 29, wherein the in-vessel handling system is further configured to shuffle ones of the plurality of fissile nuclear fuel assemblies and ones of the plurality of fissile nuclear fuel assemblies between the central core region and a portion of the reactor vessel exterior the nuclear fission reactor core.

52. The nuclear fission reactor of claim 29, wherein the reactor coolant system includes a pool of liquid sodium disposed in the reactor vessel, the nuclear fission reactor core being submerged in the pool of liquid sodium.

* * * * *